United States Patent
Kasslin et al.

(10) Patent No.: US 9,107,089 B2
(45) Date of Patent: Aug. 11, 2015

(54) METHOD, APPARATUS, AND COMPUTER PROGRAM PRODUCT FOR LOCATION BASED QUERY FOR INTERFERER DISCOVERY IN COEXISTENCE MANAGEMENT SYSTEM

(71) Applicant: Nokia Corporation, Espoo (FI)

(72) Inventors: Mika Kasslin, Espoo (FI); Jari Junell, Espoo (FI)

(73) Assignee: Nokia Technologies Oy, Espoo (FI)

( * ) Notice: Subject to any disclaimer, the term of this patent is extended or adjusted under 35 U.S.C. 154(b) by 379 days.

(21) Appl. No.: 13/672,887

(22) Filed: Nov. 9, 2012

(65) Prior Publication Data

US 2014/0135048 A1    May 15, 2014

(51) Int. Cl.

| H04B 7/00 | (2006.01) |
|---|---|
| H04B 15/00 | (2006.01) |
| H04B 1/00 | (2006.01) |
| H04B 1/04 | (2006.01) |
| H04B 1/10 | (2006.01) |
| H04W 24/02 | (2009.01) |
| H04W 16/14 | (2009.01) |

(52) U.S. Cl.
CPC ............. *H04W 24/02* (2013.01); *H04W 16/14* (2013.01)

(58) Field of Classification Search
CPC ..................................................... H04W 40/00
USPC ............................................. 455/517, 67.11
See application file for complete search history.

(56) References Cited

U.S. PATENT DOCUMENTS

| 7,826,459 | B2 | 11/2010 | Xhafa et al. |
|---|---|---|---|
| 7,830,907 | B1 | 11/2010 | Petranovich et al. |
| 7,856,008 | B2 | 12/2010 | Ayyagari et al. |

(Continued)

FOREIGN PATENT DOCUMENTS

| EP | 1863303 | 12/2007 |
|---|---|---|
| EP | 1883258 | 1/2008 |

(Continued)

OTHER PUBLICATIONS

IEEE P802.19.1TM/DF3.02; Draft Standard for TV White Space Coexistence Methods; Oct. 2012; pp. 1-250.

(Continued)

*Primary Examiner* — Tilahun B Gesesse
(74) *Attorney, Agent, or Firm* — Locke Lord LLP

(57) ABSTRACT

Method, apparatus, and computer program product embodiments are disclosed for managing coexistence of secondary users in RF spectrum. An example embodiment includes receiving, by a coexistence manager, information indicating that a candidate wireless network served by another coexistence manager may interfere with a wireless network served by the coexistence manager; determining a location related to the wireless network served by the coexistence manager; transmitting a request message to the other coexistence manager, indicating the location and requesting an estimate of a transmission signal level at the location caused by the candidate wireless network; receiving from the other coexistence manager, a response message including information indicating an estimated transmission signal level at the location caused by the candidate wireless network; and determining whether the candidate wireless network interferes with the wireless network served by the coexistence manager based on the received estimated transmission signal level.

13 Claims, 20 Drawing Sheets

(56) References Cited

U.S. PATENT DOCUMENTS

| | | | |
|---|---|---|---|
| 7,953,412 B2 | 5/2011 | Lee et al. | |
| 7,983,216 B2 | 7/2011 | Iyer et al. | |
| 8,165,106 B2 | 4/2012 | Yang et al. | |
| 8,194,549 B2 | 6/2012 | Huber et al. | |
| 8,300,624 B2 | 10/2012 | Zeller et al. | |
| 8,363,579 B2 | 1/2013 | Li et al. | |
| 8,363,602 B2* | 1/2013 | Junell et al. | 370/328 |
| 8,379,551 B2 | 2/2013 | Wietfeldt et al. | |
| 8,385,286 B2* | 2/2013 | Junell et al. | 370/329 |
| 8,412,247 B2* | 4/2013 | Junell et al. | 455/509 |
| 8,451,789 B2* | 5/2013 | Junell et al. | 370/329 |
| 8,489,137 B1* | 7/2013 | Mistry et al. | 455/522 |
| 8,514,802 B2* | 8/2013 | Junell | 370/329 |
| 8,655,400 B2* | 2/2014 | Kadous et al. | 455/522 |
| 8,737,207 B2* | 5/2014 | Kang et al. | 370/229 |
| 8,755,275 B2* | 6/2014 | Kang et al. | 370/230 |
| 8,804,510 B2* | 8/2014 | Lee et al. | 370/230 |
| 8,909,274 B2* | 12/2014 | Kasslin et al. | 455/509 |
| 8,929,831 B2* | 1/2015 | Kasslin et al. | 455/67.11 |
| 8,942,701 B2* | 1/2015 | Kasslin et al. | 455/436 |
| 8,995,553 B2* | 3/2015 | Chen et al. | 375/267 |
| 9,019,909 B2* | 4/2015 | Rinne et al. | 370/329 |
| 2003/0058829 A1 | 3/2003 | Batra | |
| 2005/0027871 A1 | 2/2005 | Bradley et al. | |
| 2006/0002326 A1 | 1/2006 | Vesuna | |
| 2006/0286986 A1 | 12/2006 | Kim et al. | |
| 2007/0086426 A1 | 4/2007 | Bonta et al. | |
| 2007/0135162 A1 | 6/2007 | Banerjea et al. | |
| 2007/0161364 A1 | 7/2007 | Surineni et al. | |
| 2007/0254596 A1 | 11/2007 | Corson et al. | |
| 2007/0274273 A1 | 11/2007 | Grushkevich et al. | |
| 2008/0043705 A1 | 2/2008 | Desai et al. | |
| 2008/0089279 A1 | 4/2008 | Hu et al. | |
| 2008/0108363 A1 | 5/2008 | Yu et al. | |
| 2008/0108365 A1 | 5/2008 | Buddhikot et al. | |
| 2008/0137627 A1 | 6/2008 | Fischer et al. | |
| 2008/0159258 A1 | 7/2008 | Ji et al. | |
| 2008/0192806 A1 | 8/2008 | Wyper et al. | |
| 2008/0228878 A1 | 9/2008 | Wu et al. | |
| 2008/0233875 A1 | 9/2008 | Desai | |
| 2008/0253341 A1 | 10/2008 | Cordeiro et al. | |
| 2008/0261639 A1 | 10/2008 | Sun et al. | |
| 2008/0268892 A1 | 10/2008 | Hamdi et al. | |
| 2008/0285525 A1 | 11/2008 | Hu | |
| 2008/0298310 A1 | 12/2008 | Hu | |
| 2009/0040937 A1 | 2/2009 | Xhafa et al. | |
| 2009/0059856 A1 | 3/2009 | Kermoal et al. | |
| 2009/0122755 A1 | 5/2009 | Seok et al. | |
| 2009/0149208 A1 | 6/2009 | Huttunen et al. | |
| 2009/0161614 A1 | 6/2009 | Grandblaise et al. | |
| 2009/0196180 A1 | 8/2009 | Bahl et al. | |
| 2009/0197627 A1 | 8/2009 | Kuffner et al. | |
| 2009/0225717 A1 | 9/2009 | Banerjea | |
| 2009/0247201 A1 | 10/2009 | Ye et al. | |
| 2009/0279449 A1 | 11/2009 | Kneckt et al. | |
| 2009/0279491 A1 | 11/2009 | Kim et al. | |
| 2009/0298522 A1 | 12/2009 | Chaudhri et al. | |
| 2010/0002608 A1 | 1/2010 | Goldhamer | |
| 2010/0046440 A1 | 2/2010 | Singh | |
| 2010/0087216 A1 | 4/2010 | Ko et al. | |
| 2010/0091731 A1 | 4/2010 | Kim et al. | |
| 2010/0097950 A1 | 4/2010 | Jeon | |
| 2010/0097952 A1 | 4/2010 | McHenry et al. | |
| 2010/0142463 A1 | 6/2010 | Hu | |
| 2010/0142469 A1 | 6/2010 | Abedi | |
| 2010/0220676 A1 | 9/2010 | Grandblaise et al. | |
| 2010/0220687 A1 | 9/2010 | Reznik et al. | |
| 2010/0232380 A1 | 9/2010 | Choi et al. | |
| 2010/0248631 A1 | 9/2010 | Chaudhri et al. | |
| 2010/0273426 A1* | 10/2010 | Walley et al. | 455/63.1 |
| 2010/0304685 A1* | 12/2010 | Wietfeldt et al. | 455/67.11 |
| 2010/0309317 A1 | 12/2010 | Wu et al. | |
| 2010/0309806 A1 | 12/2010 | Wu et al. | |
| 2010/0331029 A1 | 12/2010 | Linsky et al. | |
| 2011/0039554 A1 | 2/2011 | Bims | |
| 2011/0090887 A1 | 4/2011 | Kim et al. | |
| 2011/0090890 A1 | 4/2011 | Seok et al. | |
| 2011/0116488 A1 | 5/2011 | Grandhi | |
| 2011/0179174 A1 | 7/2011 | Kasslin et al. | |
| 2011/0199989 A1 | 8/2011 | Wietfeldt et al. | |
| 2011/0222493 A1 | 9/2011 | Mangold et al. | |
| 2011/0243094 A1* | 10/2011 | Dayal et al. | 370/331 |
| 2011/0250857 A1 | 10/2011 | Reial et al. | |
| 2011/0250921 A1 | 10/2011 | Reial | |
| 2011/0287802 A1* | 11/2011 | Ma et al. | 455/517 |
| 2011/0305206 A1 | 12/2011 | Junell et al. | |
| 2011/0310767 A1 | 12/2011 | Hu | |
| 2012/0057533 A1 | 3/2012 | Junell et al. | |
| 2012/0069746 A1 | 3/2012 | Park | |
| 2012/0077506 A1 | 3/2012 | Wietfeldt et al. | |
| 2012/0094681 A1* | 4/2012 | Freda et al. | 455/452.1 |
| 2012/0106512 A1 | 5/2012 | Banerjea et al. | |
| 2012/0127011 A1 | 5/2012 | Lee et al. | |
| 2012/0134328 A1* | 5/2012 | Gauvreau et al. | 370/329 |
| 2012/0182883 A1* | 7/2012 | Junell et al. | 370/250 |
| 2012/0195269 A1* | 8/2012 | Kang et al. | 370/329 |
| 2012/0225662 A1 | 9/2012 | Jo et al. | |

FOREIGN PATENT DOCUMENTS

| | | |
|---|---|---|
| EP | 2083591 | 7/2009 |
| GB | 2461724 | 1/2010 |
| WO | 03001742 | 1/2003 |
| WO | 2005045689 | 5/2005 |
| WO | 20070131958 | 3/2007 |
| WO | 2010027308 | 3/2010 |
| WO | 2010043270 | 4/2010 |
| WO | 2011022506 | 2/2011 |

OTHER PUBLICATIONS

International Search Report and Written Opinion for International Application No. PCT/FI0211/050777, mailed Dec. 12, 2011; 12 pgs.

International Search Report for International Application No. PCT/FI2011/050591 dated Sep. 28, 2011.

International Search Report for International Application No. PCT/FI2011/050703 issued Oct. 11, 2011.

IEEE P802.19.1/DF3.02, Draft Standard for TV White Space Coexistence Methods, Oct. 2012.

Extended European Search Report for Application No. 13154998.2-1854, completed Jun. 5, 2013.

Extended European Search Report for Application No. 13155031.1-1854, completed Jun. 6, 2013.

IEEE 802.15.2 (Part 15.2: Coexistence of Wireless Personal Area Networks with Other Wireless Devices Operating in Unlicensed Frequency Bands, dated Mar. 24, 2003; hereinafter IEEE 802.15.2.

J. Zhu, et al.,: Multi-Radio Coexistence: Challenges and Opportunities; Proceedings 16th International Conference on Computer Communications and Networks; Aug. 3, 2007, pp. 358-364.

International Search Report for International Application No. PCT/FI2012/050522 mailed Sep. 25, 2012.

J. Junell, et al., IEEE P80219, Wireless Coexistence, Proposal on coexistence system services and protocols; Nov. 7, 2010, XP002681996; pp. 1-46.

J. Junell, et al., Coexistence for unlicensed spectrum users in white spaces; Applied Services in Biomedical and Communication Technologies (ISABEL); 3rd International Symposium on, IEEE; Nov. 7, 2010, pp. 1-5.

Extended European Search Report dated Aug. 30, 2012 for EP Application No. 12162039.7-1525.

International Search Report and Written Opinion mailed Jul. 29, 2011 in International Application Serial No. PCT/F12011/050266, 13pp.

International Search Report mailed Nov. 29, 2011 in International Application Serial No. PCT/F12011/050714, 13pp.

European Search report dated Jun. 27, 2012 for European Application No. 12155105.5-1525.

International Search Report and Written Opinion mailed Mar. 14, 2012 in International Application Serial No. PCT/F12011/051128, 15pp.

(56) References Cited

OTHER PUBLICATIONS

International Search Report and Written Opinion mailed Apr. 2, 2012 in International Application Serial No. PCT/F12011/051127, 15pp.
Paine et al., "WhiteSpace Coexistence Use Cases", IEEE P802.19 Wireless Coexistence, IEEE 802.19-09/26r4, Jul. 16, 2009, pp. 1-14.
Chen Sun et al., "TVWS Coexistence Use Cases", IEEE 802.19 DCN 19-10-0008-01-0000, pp. 1-14.
T. Baykas, et al; IEEE P802.19-10/0055r3 Wireless Coexistence—System Design Document; Mar. 18, 2010, p. 1-15.
M. Rahman; IEEE 802.19-10-0010-00-tvws; Possible Coexistence cases in TVWS and Topics to be Considered in P802.19.1; Jan. 1, 2009; pp. 1-10.
Sherman, M.; SG-whitespace-09-0055-00-0000 TV Whitespace Tutorial; Mar. 10, 2009.
Ruuska P. et al.; "P802.19 System Architecture". IEEE Mentor, IEEE Standards Association, doc.: IEEE 802.19-10/46r3, Mar. 17, 2010, [online], [retrieved on Dec. 1, 2011]. Retrieved from the Internet: <URL: https:// mentor.ieee.org/802.19/documents>.
Akyildiz I. et al., "Next Generation/Dynamic Spectrum Access/Cognitive Radio Wireless Networks: A survey", Sep. 15, 2006, Elsevier Science Publishers B. V., Amsterdam, NL, ISSN 1389-1286, pp. 2127-2159.
J. C. Zuniga, et al; IEEE 802-SG-WhiteSpace-09/0032r4; Media Independent Coexistence; Mar. 11, 2009, p. 1-10.
H. Wang, et al; IEEE 802.19-09/0034r3; Media Independent Coexistence for Devices in White Space; Jul. 10, 2009, p. 1-12.
M. Kasslin; IEEE 802.19-10/0055r02; Wireless Coexistence; System Design Document; Mar. 18, 2010, p. 1-12.
Cavalcanti et al, IEEE 802.22-07/0121 r1 : Proposed text changes to Section 6.21.2 Self-coexistence in IEEE 802.22/D0.2 Draft Standard published in Mar. 2007.
Cordeiro et al, "Cognitive PHY and MAC Layers for Dynamic Spectrum Access and Sharing of TV Bands", published by ACM on Aug. 5, 2006.
Karama Hamdi, et al., "Power Control in Cognitive Radio Systems Based on Spectrum Sensing Side Information", Proc. IEEE International Conference on Communications (ICC'07), pp. 5161-5165, Jun. 2007.
Ian F. Akyildiz, et al., "A Survey on Spectrum Management in Cognitive Radio Networks", IEEE Communications Magazine Apr. 2008, pp. 40-48.
Dong In Kim, et al., "Joint Rate and Power Allocation for Cognitive Radios in Dynamic Spectrum Access Environment", IEEE Transactions on Wireless Communications, vol. 7, No. 12, Dec. 2008, pp. 5517-5527.
Fabrizio Granelli, et al., "Standardization and Research in Cognitive and Dynamic Spectrum Access Networks: IEEE SCC41 Efforts and Other Activities", IEEE Communications Magazine Jan. 2010, pp. 71-79.
Zander, "Can We Find 9and Use) "Spectrum Holes"? Spectrum Sensing and Spatial reuse Opportunities in Cognitive Radio Systems", Vehicular Technology Conference, 2009. VTC Spring 2009. IEEE 69th, Date: Apr. 26-29, 2009, pp. 1-5.
H. Harada; "Research and development on cognitive and software radio technologies—Devices and hardware platform-" General assembly of URSI, Aug. 2008., 4pp.
A. Mody et al., "A Survey of Standards Supporting Cognitive radio and Dynamic Spectrum Access." IEEE, 978-1-4244-2677-5/08, pp. 1-7.
R. Venkatesha et al., "Cognitive Functionality in Next Generation Wireless Networks: Standardization Efforts", IEEE Communications Magazine, Apr. 2008, pp. 72-78.
Dong Neon Lee et al., "Self-coexistence techniques for cognitive radio LANS/PANS", 21st Annual IEEE International Symposium on Personal Indoor and Mobile Radio Communications (PIMRC), 26.9. 2010, IEEE, Piscataway, NJ, USA, pp. 1516-1520, Chapter III B.
Ashraf, I. et al., "Impact of Interfering Bluetooth Piconets on a Collocated p-Persistent CSMA-Based WLAN" IEEE Transactions on Vehicular Technology, vol. 58, No. 9, Jan. 11, 2009, pp. 4962-4975.
Asterjadhi, A. et al., "Jenna: A Jamming Evasive Network-Coding Neighbor-Discovery Algorithm for Cognitive radio Networks", IEEE Wireless Communications, vol. 17, No. 4, Jan. 8, 2010, pp. 24-32.
Baykas, T., et al., "Overview of TV White Spaces: Current regulations, standards and coexistence between secondary users", 2010 IEEE 21st International Symposium on Personal, Indoor, and Mobile Radio Communications Workshops (PIMRC Workshops), Sep. 26-30, 2010, Istanbul, Turkey, IEEE, Piscataway, NJ, USA, pp. 38-43.
Peha, J.M.; "Sharing Spectrum Through Spectrum Policy reform and Cognitive Radio", Proceedings of the IEEE, vol. 97, No. 4, Jan. 4, 2009, pp. 708-719.
P. Camarda et al., "An Exclusive Self-Coexistence (ESC) Resource Sharing Algorithm for Cognitive 802. 22 Networks," 2010 5th International Symposium on Wireless Pervasive Computing (ISWPC), pp. 128-133.
Mark Cummings, "Perspectives on Architecture for IEEE 802.191. 1", Nov. 11, 2010, pp. 1-15.
S. Filin et al., "P802.19.1 General Architecture," IEEE 802.19-10-00007, Jan. 16, 2010, pp. 1-9.
Minnie Ingersoll, "White Spaces Database," IEEE 802.19-09-/0047r0, Jul. 16, 2009, pp. 1-23.

\* cited by examiner

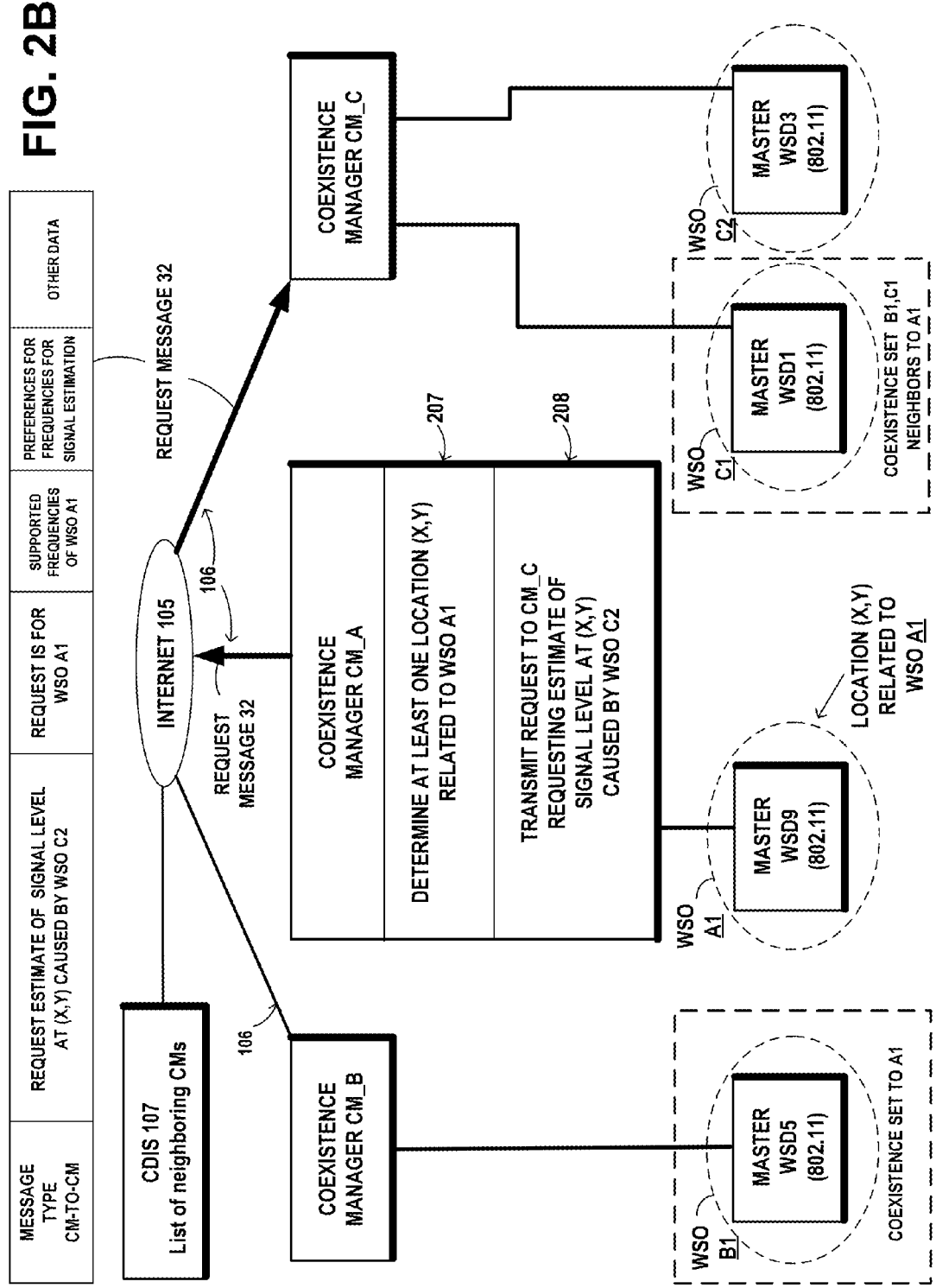

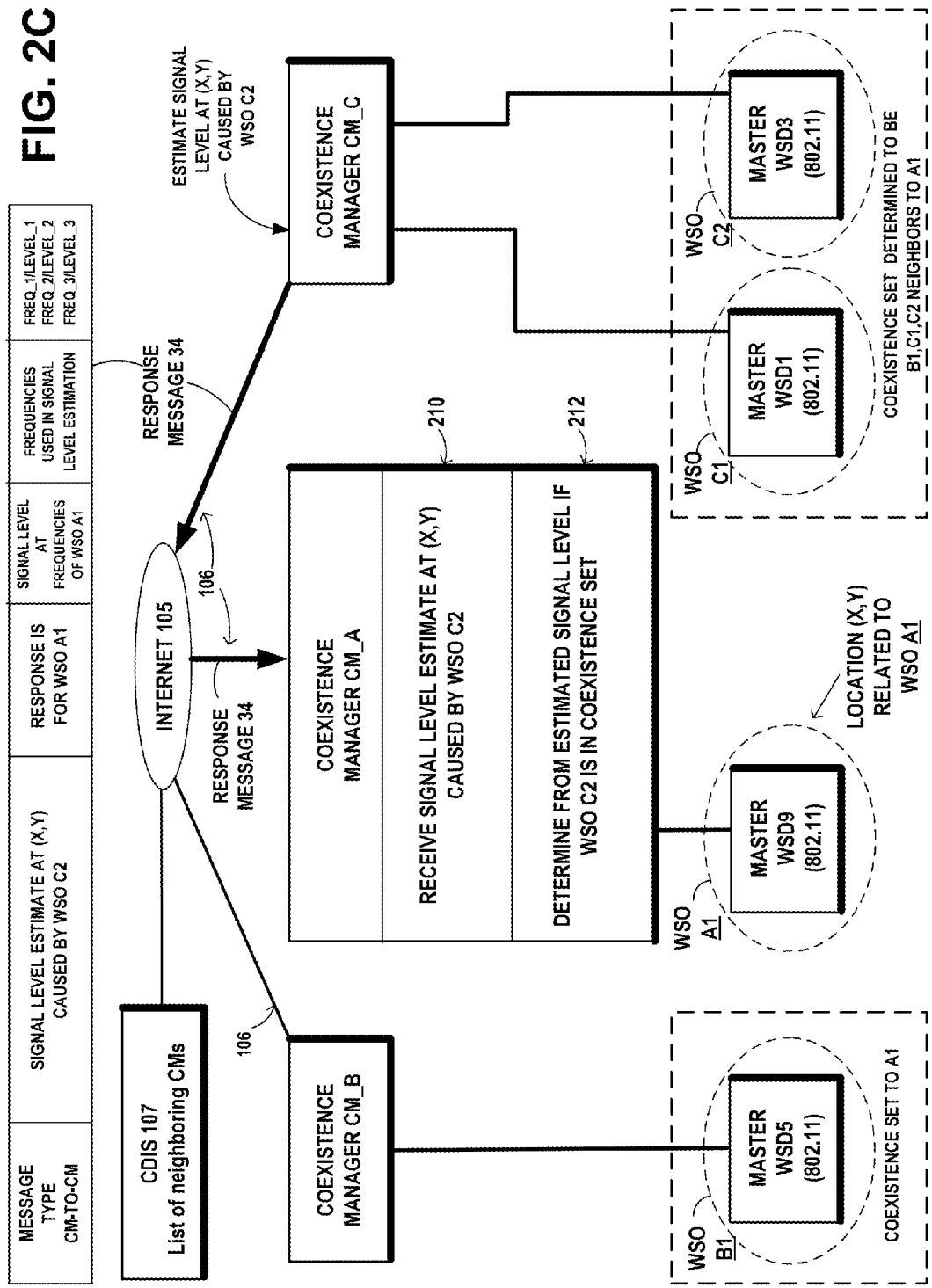

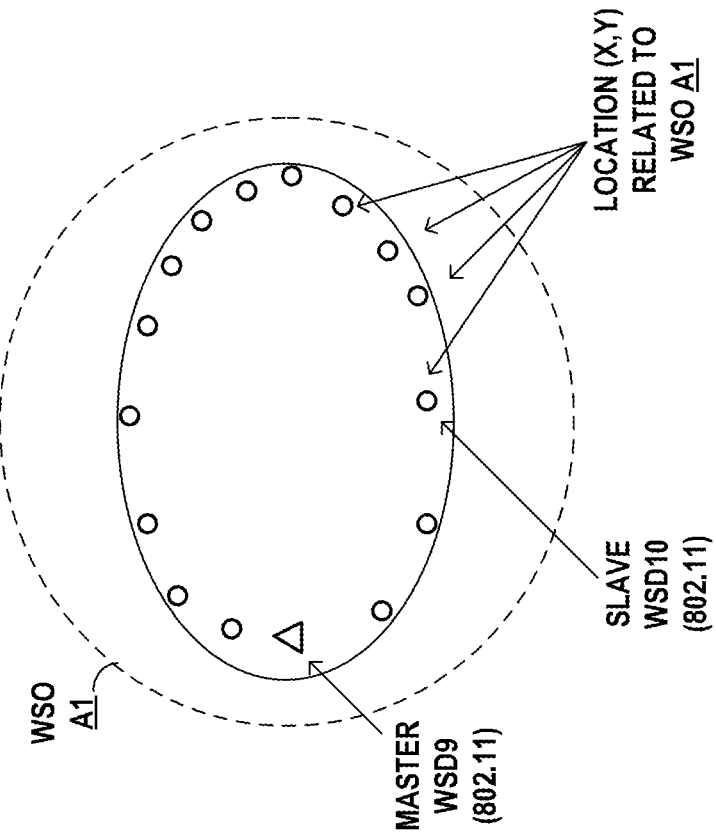
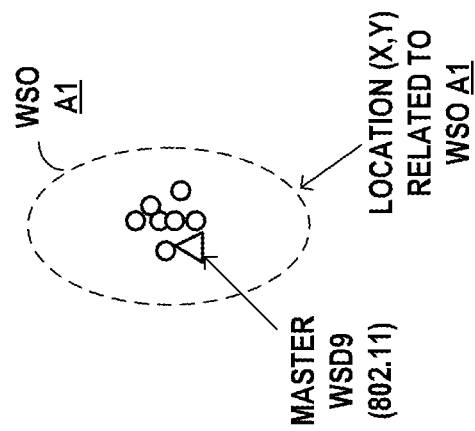

STEP 602: RECEIVING, BY A COEXISTENCE MANAGER, INFORMATION INDICATING THAT A CANDIDATE WIRELESS NETWORK SERVED BY ANOTHER COEXISTENCE MANAGER MAY INTERFERE WITH A WIRELESS NETWORK SERVED BY THE COEXISTENCE MANAGER;

STEP 604: DETERMINING, BY THE COEXISTENCE MANAGER, AT LEAST ONE LOCATION RELATED TO THE WIRELESS NETWORK SERVED BY THE COEXISTENCE MANAGER ;

STEP 606: TRANSMITTING, BY THE COEXISTENCE MANAGER, A REQUEST MESSAGE TO THE OTHER COEXISTENCE MANAGER, INDICATING THE AT LEAST THE ONE LOCATION AND REQUESTING AN ESTIMATE OF A TRANSMISSION SIGNAL LEVEL AT THE AT LEAST ONE LOCATION CAUSED BY THE CANDIDATE WIRELESS NETWORK;

STEP 608: RECEIVING, BY THE COEXISTENCE MANAGER, FROM THE OTHER COEXISTENCE MANAGER, A RESPONSE MESSAGE INCLUDING INFORMATION INDICATING AN ESTIMATED TRANSMISSION SIGNAL LEVEL AT THE AT LEAST ONE LOCATION CAUSED BY THE CANDIDATE WIRELESS NETWORK; AND

STEP 610: DETERMINING, BY THE COEXISTENCE MANAGER, WHETHER THE CANDIDATE WIRELESS NETWORK INTERFERES WITH THE WIRELESS NETWORK SERVED BY THE COEXISTENCE MANAGER BASED ON THE RECEIVED ESTIMATED TRANSMISSION SIGNAL LEVEL AT THE AT LEAST ONE LOCATION.

STEP 652: RECEIVING, BY A COEXISTENCE MANAGER, A REQUEST MESSAGE FROM ANOTHER COEXISTENCE MANAGER, INDICATING AT LEAST ONE LOCATION RELATED TO ANOTHER WIRELESS NETWORK SERVED BY THE OTHER COEXISTENCE MANAGER AND REQUESTING AN ESTIMATE OF A TRANSMISSION SIGNAL LEVEL AT THE AT LEAST ONE LOCATION RELATED TO THE OTHER WIRELESS NETWORK, CAUSED BY A CANDIDATE WIRELESS NETWORK SERVED BY THE COEXISTENCE MANAGER;

→

STEP 654: ESTIMATING, BY THE COEXISTENCE MANAGER, A TRANSMISSION SIGNAL LEVEL AT THE AT LEAST ONE LOCATION RELATED TO THE OTHER WIRELESS NETWORK, CAUSED BY THE CANDIDATE WIRELESS NETWORK; AND

→

STEP 656: TRANSMITTING, BY THE COEXISTENCE MANAGER, A RESPONSE MESSAGE INCLUDING INFORMATION INDICATING THE ESTIMATED TRANSMISSION SIGNAL LEVEL AT THE AT LEAST ONE LOCATION.

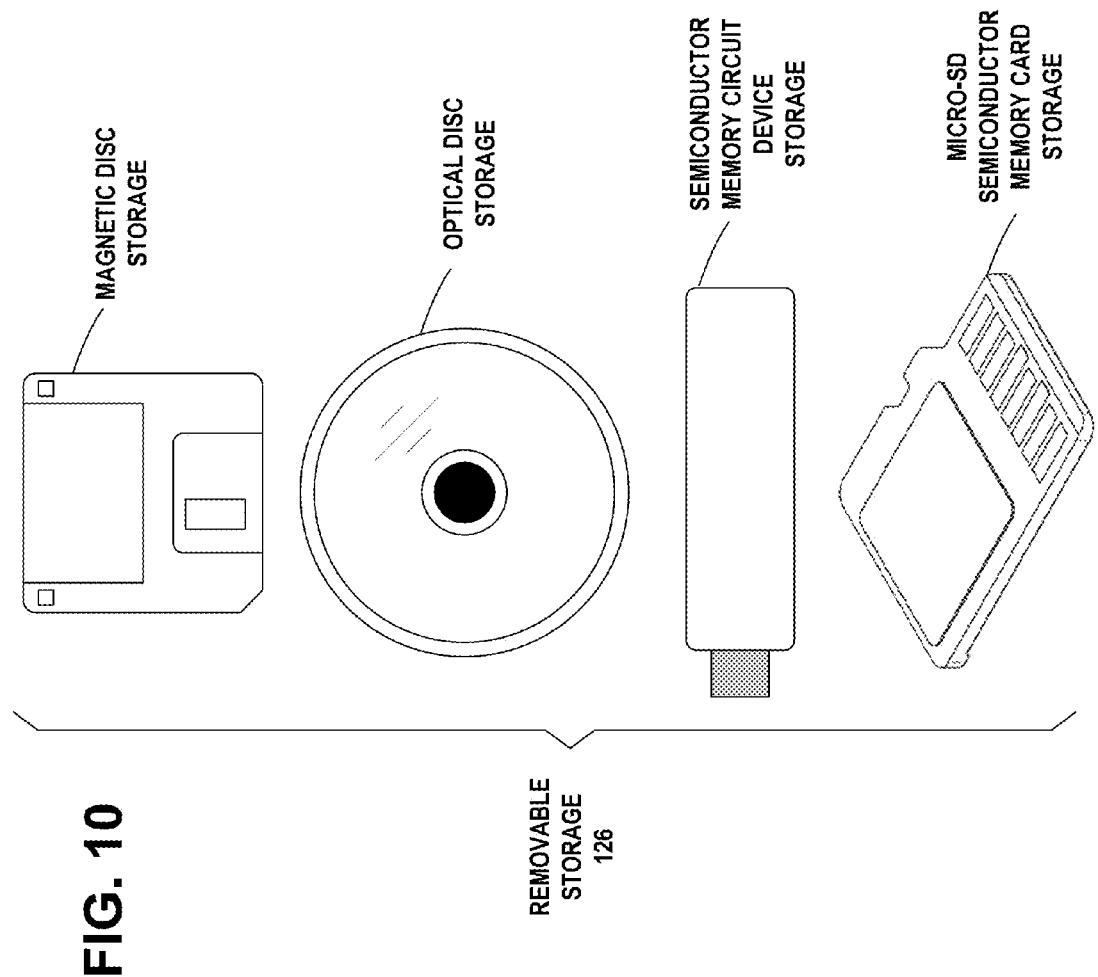

METHOD, APPARATUS, AND COMPUTER PROGRAM PRODUCT FOR LOCATION BASED QUERY FOR INTERFERER DISCOVERY IN COEXISTENCE MANAGEMENT SYSTEM

FIELD

The field of the invention relates to efficient radio spectrum use, and more particularly to managing coexistence of secondary users in RF spectrum.

BACKGROUND

Use of radio frequency bands of the electromagnetic spectrum is regulated by governments in most countries, by allocating specific frequency bands to particular types of uses, such as licensed bands for commercial radio and television broadcasting, cellular telephony, mobile networks such as CDMA2000, WCDMA, HSPA, LTE, and IMT, maritime radio, police, fire, and public safety radio, GPS, radio astronomy, earth stations for satellite communications, and many other uses. Governments also allocate unlicensed bands, for example, for Wireless Regional Area Network (WRAN) broadband access for rural areas and wireless local area networks (WLAN) and wireless personal area networks (WPAN), such as the industrial, scientific, and medical (ISM) band.

In the United States, the Federal Communications Commission (FCC) regulates use of the radio spectrum, including radio and television broadcasting. Frequencies are allocated according to a bandplan in which guard bands are assigned between the allocated radio bands to avoid interference between adjacent signals. There are also unassigned frequency bands in the spectrum that either have never been used or have become free as a result of changes in technology. Unassigned or un-used frequencies also appear locally inside the frequency bands, which are otherwise allocated in other locations. The unassigned frequency bands and guard bands are referred to as white spaces.

TV white space may be broadly defined as broadcast television spectrum that is unused by licensed services. There are at least two categories of TV white space: [1] Dedicated TV white space is a portion of the spectrum that the FCC has reallocated to unlicensed use from previously analog broadcast usage, and [2] Locally unused spectrum by licensed TV broadcasters in a geographic area.

[1] Dedicated TV white space: In the United States, the FCC has dedicated approximately 400 MHz of white spaces for unlicensed use that became unused after a federally mandated transformation of analog TV broadcasting to digital TV broadcasting. However, the FCC has prohibited unlicensed use of white spaces from interfering with existing licensed uses, including digital TV stations, low power TV stations, cable TV headends, and sites where low power wireless microphones are used. Various proposals have been made for unlicensed use of the white spaces left by the termination of analog TV, for example rural broadband deployment, auxiliary public safety communications, educational and enterprise video conferencing, personal consumer applications, mesh networks, security applications, municipal broadband access, enhanced local coverage and communications, fixed backhaul, and sensor aggregation for smart grid meter reading.

[2] Locally unused spectrum by licensed TV broadcasters: The FCC has adopted rules to allow unlicensed radio transmitters to operate in the broadcast television spectrum at locations where that spectrum is not being used by licensed broadcasters. The FCC proposes two mechanisms to enable the unlicensed transmitter to discover the available channels: geo-location and database based approach, and spectrum sensing. The use of one of the mechanisms is required for the unlicensed transmitter. The FCC proposed the use of geolocation to establish the location of the unlicensed transmitter and a database of TV bands use by licensed broadcasters organized by their geographic coverage areas, to enable the unlicensed transmitter to know where local TV band white spaces may be available. The FCC proposed the use of spectrum sensors in the unlicensed transmitter to detect the presence of the incumbent, primary TV broadcaster's signal in the local TV band to enable the unlicensed transmitter to immediately relinquish using the band. A primary user in such a local TV band would be an incumbent TV broadcaster licensed to operate in that band, but in those geographic areas where there are no licensed incumbent TV broadcasters in operation, other unlicensed secondary users may make use of that band. There may be also other incumbent users in the TV band, which the secondary users should avoid, such as program making and special events (PMSE) systems.

In addition to the United States, other countries are also considering to enable unlicensed, secondary operation in TV band white spaces. The requirements may slightly differ in different countries, e.g. in the United States the maximum transmit power for unlicensed device is defined based on the device type, whereas in Europe location specific maximum transmission power has been considered. In that case the maximum allowed transmission power for an unlicensed device would depend on the device geo-location, i.e. the distance from the primary users. The device characteristics, such as emission mask/ACLR (adjacent channel leakage ratio) may affect the maximum allowed transmission power.

Other RF spectrum white spaces may be defined as RF spectrum that is locally unused in certain geographic areas, such as for example frequency allocations from maritime radio in landlocked areas remote from the sea. A primary user in such a maritime radio band would be a maritime radio licensed to operate in that band, but in those geographic areas where there are no licensed maritime radios in operation, other unlicensed secondary users may make use of that band. Similarly, locally unused spectrum white spaces may be present in certain geographic locations, such as the frequency allocations from 2.025 GHz to 2.110 GHz for earth stations to transmit to communications satellites, in areas remote from such earth stations. A primary user in such a satellite earth station radio band would be a satellite earth station licensed to operate in that band, but in those geographic areas where there are no satellite earth stations in operation, other unlicensed secondary users may make use of that band. Further, other schemes of secondary use of spectrum, other than unlicensed schemes may exist, such as licensing, regulator defined policies, cognitive principles, or authorized shared access.

SUMMARY

Method, apparatus, and computer program product embodiments are disclosed for managing coexistence of secondary users in RF spectrum.

An example embodiment of the invention includes a method comprising:

receiving, by a coexistence manager, information indicating that a candidate wireless network served by another coexistence manager may interfere with a wireless network served by the coexistence manager;

determining, by the coexistence manager, at least one location related to the wireless network served by the coexistence manager;

transmitting, by the coexistence manager, a request message to the other coexistence manager, indicating the at least the one location and requesting an estimate of a transmission signal level at the at least one location caused by the candidate wireless network;

receiving, by the coexistence manager, from the other coexistence manager, a response message including information indicating an estimated transmission signal level at the at least one location caused by the candidate wireless network; and determining, by the coexistence manager, whether the candidate wireless network interferes with the wireless network served by the coexistence manager based on the received estimated transmission signal level at the at least one location.

An example embodiment of the invention includes a method comprising:

wherein the information indicating that the candidate wireless network may interfere with the wireless network served by the coexistence manager is received from a coexistence discovery and information server.

An example embodiment of the invention includes a method comprising:

performing, by the coexistence manager, calculations using the received estimated transmission signal level, to estimate an effect of the received estimated transmission signal level on the wireless network served by the coexistence manager; and determining, by the coexistence manager, to include the candidate wireless network in a coexistence set based on the performed calculations.

An example embodiment of the invention includes a method comprising:

wherein the at least one location related to the wireless network served by the coexistence manager, is one of actual location or estimated location of one or more apparatuses belonging to the wireless network.

An example embodiment of the invention includes a method comprising:

wherein the request message includes at least one of an identification of the wireless network served by the coexistence manager, and frequencies at which the wireless network served by the coexistence manager, is capable of operating.

An example embodiment of the invention includes a method comprising:

wherein locations indicated in the request cover locations of a master device and most probable locations of slave devices in the wireless network served by the coexistence manager.

An example embodiment of the invention includes an apparatus comprising:

at least one processor;

at least one memory including computer program code;

the at least one memory and the computer program code configured to, with the at least one processor, cause the apparatus at least to:

receive information indicating that a candidate wireless network served by another coexistence manager may interfere with a wireless network served by the apparatus;

determine at least one location related to the wireless network served by the apparatus;

transmit a request message to the other coexistence manager, indicating the at least the one location and requesting an estimate of a transmission signal level at the at least one location caused by the candidate wireless network;

receive from the other coexistence manager, a response message including information indicating an estimated transmission signal level at the at least one location caused by the candidate wireless network; and determine whether the candidate wireless network interferes with the wireless network served by the apparatus, based on the received estimated transmission signal level at the at least one location.

An example embodiment of the invention includes an apparatus comprising:

wherein the information indicating that the candidate wireless network may interfere with the wireless network served by the coexistence manager is received from a coexistence discovery and information server.

An example embodiment of the invention includes an apparatus comprising:

the at least one memory and the computer program code configured to, with the at least one processor, cause the apparatus at least to:

perform calculations using the received estimated transmission signal level, to estimate an effect of the received estimated transmission signal level on the wireless network served by the coexistence manager; and determine to include the candidate wireless network in a coexistence set based on the performed calculations.

An example embodiment of the invention includes an apparatus comprising:

wherein the at least one location related to the wireless network served by the coexistence manager, is one of actual location or estimated location of one or more apparatuses belonging to the wireless network.

An example embodiment of the invention includes an apparatus comprising:

wherein the request message includes at least one of an identification of the wireless network served by the coexistence manager, and frequencies at which the wireless network served by the coexistence manager, is capable of operating.

An example embodiment of the invention includes an apparatus comprising:

wherein locations indicated in the request cover locations of a master device and most probable locations of slave devices in the wireless network served by the coexistence manager.

An example embodiment of the invention includes a computer program product comprising computer executable program code recorded on a computer readable, non-transitory storage medium, the computer executable program code comprising:

code for receiving, by a coexistence manager, information indicating that a candidate wireless network served by another coexistence manager may interfere with a wireless network served by the coexistence manager;

code for determining, by the coexistence manager, at least one location related to the wireless network served by the coexistence manager;

code for transmitting, by the coexistence manager, a request message to the other coexistence manager, indicating the at least the one location and requesting an estimate of a transmission signal level at the at least one location caused by the candidate wireless network;

code for receiving, by the coexistence manager, from the other coexistence manager, a response message including information indicating an estimated transmission signal level at the at least one location caused by the candidate wireless network; and code for determining, by the coexistence manager, whether the candidate wireless network interferes with the wireless network served by the coexistence manager based on the received estimated transmission signal level at the at least one location.

An example embodiment of the invention includes a method comprising:

receiving, by a coexistence manager, a request message from another coexistence manager, indicating at least one location related to another wireless network served by the other coexistence manager and requesting an estimate of a transmission signal level at the at least one location, caused by a candidate wireless network served by the coexistence manager;

estimating, by the coexistence manager, a transmission signal level at the at least one location, caused by the candidate wireless network served by the coexistence manager; and transmitting, by the coexistence manager, a response message including information indicating the estimated transmission signal level at the at least one location.

An example embodiment of the invention includes a method comprising:

wherein the request message includes one or more of frequencies at which the coexistence manager is requested to estimate the transmission signal level.

An example embodiment of the invention includes an apparatus, comprising:

at least one memory including computer program code;

the at least one memory and the computer program code configured to, with the at least one processor, cause the apparatus at least to:

receive a request message from another coexistence manager, indicating at least one location related to another wireless network served by the other coexistence manager and requesting an estimate of a transmission signal level at the at least one location related to the other wireless network, caused by a candidate wireless network served by the apparatus;

estimate a transmission signal level at the at least one location related to the other wireless network, caused by the candidate wireless network; and transmit a response message including information indicating the estimated transmission signal level at the at least one location.

An example embodiment of the invention includes an apparatus, comprising:

wherein the request message includes one or more of frequencies at which the coexistence manager is requested to estimate the transmission signal level.

An example embodiment of the invention includes a computer program product comprising computer executable program code recorded on a computer readable, non-transitory storage medium, the computer executable program code comprising:

code for receiving, by a coexistence manager, a request message from another coexistence manager, indicating at least one location related to another wireless network served by the other coexistence manager and requesting an estimate of a transmission signal level at the at least one location related to the other wireless network, caused by a candidate wireless network served by the coexistence manager;

code for estimating, by the coexistence manager, a transmission signal level at the at least one location related to the other wireless network, caused by the candidate wireless network; and code for transmitting, by the coexistence manager, a response message including information indicating the estimated transmission signal level at the at least one location.

The example embodiments of the invention manage coexistence of secondary users in RF spectrum.

DESCRIPTION OF THE FIGURES

FIG. 2B is an example system architecture according to an example embodiment of the invention of FIG. 2A, which illustrates the requesting coexistence manager CM_A determining at least one location (X,Y) related to WSO A1. The requesting coexistence manager CM_A transmits a request message to CM_C requesting an estimate of the signal level for at least one location (X,Y) of WSO A1, caused by WSO C2, in an example embodiment of the invention.

FIG. 2C is an example system architecture according to an example embodiment of the invention of FIG. 2A, which illustrates the responding coexistence manager CM_C responding to the request by estimating the signal level for at least one location (X,Y) of WSO A1, caused by WSO C2 and transmitting a response message to the requesting coexistence manager, including the estimated signal level for at least one location (X,Y) of WSO A1, caused by WSO C2. The requesting coexistence manager CM_A determines from the estimated signal level, if the WSO C2 is in the coexistence set of WSO A1. In the example shown, the estimated transmission signal level at the at least one location (X,Y) of WSO A1, is sufficiently high to justify including WSO C2 in the coexistence set of WSO A1, in an example embodiment of the invention.

FIG. 3A is an example network diagram of the WSO A1, illustrating that the at least one location (X,Y) related to WSO A1 may be the actual location, where WSO A1 is a single transceiver in one location and the requesting coexistence manager CM_A is permitted to release the WSO's location to another coexistence manager. Alternately, the requesting coexistence manager CM_A may indicate a set of locations, one of which may be the actual location of the WSO A1, in an example embodiment of the invention.

FIG. 3B is an example network diagram of the WSO A1 as a network comprising a master device and several slave devices, illustrating that the at least one location (X,Y) related to WSO A1 may be an average of all of the locations of the devices in the network, in an example embodiment of the invention.

FIG. 4B is an example network diagram of the WSO C2, illustrating that WSO C2 is a network comprising a master device WSD3 and several slave devices including slave device WSD4, then the responding coexistence manager CM_C estimates the maximum signal level for at least one location (X,Y) of WSO A1, caused by the devices (actual or estimated ones) in the network of WSO C2, in an example embodiment of the invention.

FIG. 8A is an example flow diagram 600 of operational steps in requesting coexistence manager CM_A, according to an embodiment of the present invention.

FIG. 8B is an example flow diagram 650 of operational steps in responding coexistence manager CM_C, according to an embodiment of the present invention.

FIG. 10 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

Figure 1A:
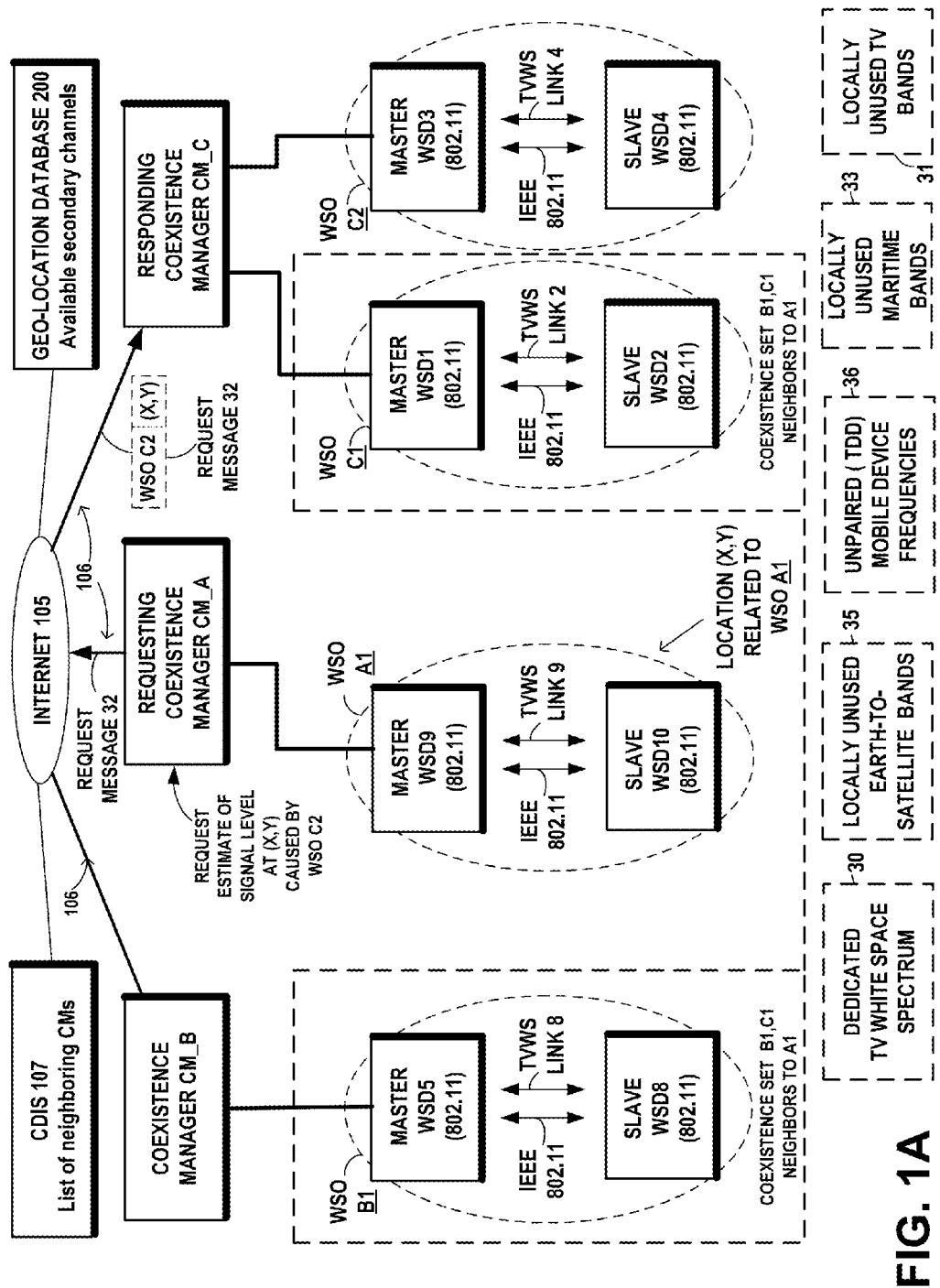
FIG. 1A is a system architecture diagram according to an example embodiment of the invention, illustrating three network controllers or coexistence managers CM_A, CM_B, and CM_C, each managing resource allocations of white space spectrum for a respective wireless networks or white space objects (WSOs) A1, B1, and C1/C2. The WSOs B1 and C1 are in the coexistence set for WSO A1. The requesting coexistence manager CM_A has received information from the coexistence discovery and information server (CDIS) indicating that WSO C2 is a candidate for inclusion in the coexistence set for WSO A1. The requesting coexistence manager CM_A determines at least one location (X,Y) related to WSO A1. The requesting coexistence manager CM_A transmits a request message to CM_C requesting an estimate of the signal level for at least one location (X,Y) of WSO A1, caused by WSO C2, in an example embodiment of the invention.

DISCUSSION OF EXAMPLE EMBODIMENTS
OF THE INVENTION

In the United States, the FCC has opened up 300 MHz to 400 MHz of white spaces for unlicensed use that became unused after a federally mandated transformation of analog TV broadcasting to digital TV broadcasting. However, the FCC has prohibited unlicensed use of white spaces from interfering with existing licensed uses, including digital TV stations, low power TV stations, cable TV headends, and sites where low power wireless microphones are used.

The FCC has defined the regulation of white spaces in *Second Memorandum Opinion and Order*, FCC 10-174, Sep. 23, 2010 for secondary white space devices (WSD). In Europe, the European Conference of Postal and Telecommunications Administrations (CEPT) has defined initial requirements in ECC Report 159: *Technical and Operational Requirements for the Possible Operation of Cognitive Radio Systems in the 'White Spaces' of the Frequency Band 470-790 MHz*, January 2011.

Various proposals have been made for unlicensed use of the white spaces left by the termination of analog TV, for example rural broadband deployment, auxiliary public safety communications, educational and enterprise video conferencing, personal consumer applications, mesh networks, security applications, municipal broadband access, enhanced local coverage and communications, fixed backhaul, and sensor aggregation for smart grid meter reading.

Coexistence standards are currently being developed to enable two or more independently operated wireless networks or devices using any radio technologies adapted for TV white space frequency bands, to access the same TV white space frequency band in the same location without mutual interference.

The IEEE 802.19 Working Group is currently defining coexistence rules for heterogeneous secondary networks. An example embodiment enables coexistence between heterogeneous secondary networks. Primary networks and users are incumbent users of the selected frequency band that have a form of priority access to the band. Primary networks include networks operating in FCC licensed bands, such as for commercial radio and television broadcasting. Secondary networks and users are allowed to use the selected band only if there are resources that are not used by the primary users. Secondary networks include any broadband networks operating unlicensed in the TV white spaces (TVWS) and using transmission devices that comply with the FCC requirements for TV Band Devices (TVBDs). Fixed TVBD devices must include geo-location and query a database to determine allowed channels. Portable master TVBD devices must be able to access geo-location data or include a spectrum sensing capability to identify TV and wireless microphone signals.

The FCC has adopted rules to allow unlicensed radio transmitters to operate in the broadcast television spectrum at locations where that spectrum is not being used by licensed broadcasters. The FCC required the use of geo-location to establish the location of the unlicensed transmitter and a database of TV bands use by licensed broadcasters organized by their geographic coverage areas, to enable the unlicensed transmitter to know where local TV band white spaces may be available. Alternatively, the FCC required the use of spectrum sensors in the unlicensed transmitter to detect the presence of the incumbent, primary TV broadcaster's signal in the local TV band white space to enable the unlicensed transmitter to immediately relinquish using the band. A primary user in such a local TV band white space would be an incumbent TV broadcaster licensed to operate in that band, but in those geographic areas where there are no licensed incumbent TV broadcasters in operation, other unlicensed secondary users may make use of that band.

Other spectrum white spaces may be locally unused in certain geographic areas, such as the frequency allocations from maritime radio in landlocked areas remote from the sea. A primary user in such a maritime radio band would be a maritime radio licensed to operate in that band, but in those geographic areas where there are no licensed maritime radios in operation, other unlicensed secondary users may make use of that band. Similarly, locally unused spectrum white spaces may be present in certain geographic locations, such as the frequency allocations from 2.025 GHz to 2.110 GHz for earth stations to transmit to communications satellites, in areas remote from such earth stations. A primary user in such a satellite earth station radio band would be a satellite earth station licensed to operate in that band, but in those geographic areas where there are no satellite earth stations in operation, other unlicensed secondary users may make use of that band.

Active coexistence between secondary networks using the RF white spaces may require new techniques for fairly sharing the available bandwidth among different heterogeneous secondary networks and accord the required preference for primary users of the band. Such new techniques may require some form of communication between the secondary networks to enable a fair usage of the local spectrum.

A network controller or coexistence manager (CM) is the main decision maker of the coexistence system proposed by the IEEE 802.19 Working Group defining coexistence rules for heterogeneous secondary networks. The coexistence manager (CM) discovers and solves the coexistence conflicts of the networks operating in the same area. A CM serves one or more networks. Depending on the deployment, it may reside either in a TV band device (TVBD) network or device, also referred to as a white space object (WSO), or in the Internet. In independent networks it may reside in a TVBD. The CM discovers the interfering networks and their CMs, and shares information with other CMs. Based on the collected information it reconfigures the operation of its own networks, but also performs resource reallocation for those WSOs in a coexistence set the CM is allowed to, as needed.

In the United States, the white space device (WSD) may operate as a master WSD of a network of associated slave WSD devices. For example, the master WSD may be an access point or base station. The master WSD is expected to access the geo-location database (DB) on behalf of its slave WSD devices, to discover the available spectrum that is not used by the incumbent users, for example, TV broadcasters.

A master WSD and its wireless network are registered through a control node or coexistence enabler (CE) to the network controller or coexistence manager (CM). The key functions of coexistence enabler (CE) are to obtain information required for the coexistence from the WSO, and to reconfigure the WSO operation according the coexistence decisions that are received from the coexistence manager (CM). The collected information covers the capabilities and the resource needs of the TVBD network and the characteristics of the radio environment. The CE may reside in the master WSD, such as an access point, base station, or mesh point.

The following discussion employs terms that are defined as follows:
  WSO (White Space Object)=TVBD network or device.
  Coexistence set=neighbors.
    Coexistence set is a set of WSOs otherwise referred to as neighbors.
    Each coexistence manager (CM) determines and maintains a coexistence set for each WSO that it serves. A WSO's coexistence set comprises of other WSOs that may interfere the WSO or that the WSO may interfere with.
    Interference is the effect of unwanted energy due to one or a combination of emissions, radiations, or inductions upon reception in a radiocommunication system, manifested by any performance degradation, misinterpretation, or loss of information that could be extracted in the absence of such unwanted energy.
  Coexistence set element=neighbor TVBD network or device
    A WSO that belongs to a coexistence set
  Coexistence set extension=Limiting networks (the neighbors of neighbors)
    Each CM has a coexistence set extension (also referred to as an extended coexistence set) for each coexistence set it has (one per WSO the CM serves). The extension comprises those WSOs that belong to the coexistence sets of WSOs in one's own coexistence set, but that do not belong to the one's own coexistence set.
  Coexistence managers (CMs) may be organized according to different decision making topologies for interacting and collaborating with each other when determining resource allocations for the wireless networks and devices that they serve. The coexistence managers (CMs) may operate autonomously, they may employ centralized decision making, or they may share making the decisions in distributed decision making When a system of coexistence managers (CMs) employs centralized decision making, a serving CM will transfer responsibility for resource allocation for a wireless network that it serves, to another CM, referred to herein as the master CM. As used herein, the serving CM is also referred to as a slave CM and the wireless network that it serves is referred to as a transfer wireless network.

In an example embodiment of the invention, the serving CM has a coexistence enabler (CE) for a transfer wireless network, which is registered with the serving CM, and the serving CM uses distributed or autonomous decision making for resource allocation for the transfer wireless network. The serving CM may need to transfer responsibility for resource allocation for a wireless network that it serves, in the following example circumstances:

There is one or a few CMs to which are registered most of the coexistence enablers (CEs) of the wireless networks in the coexistence set of the transfer wireless network;

The number of CMs is high, to which the coexistence set elements of the transfer wireless network are registered; or The serving CM is about to run out of resources to serve all the CEs that are registered to it.

FIG. 1A is a system architecture diagram according to an example embodiment of the invention, illustrating three network controllers or coexistence managers CM_A, CM_B, and CM_C, each managing resource allocations of white space spectrum for a respective wireless networks or white space objects (WSOs) A1, B1, and C1/C2. The WSOs B1 and C1 are in the coexistence set for WSO A1. The requesting coexistence manager CM_A has received information from the coexistence discovery and information server (CDIS) indicating that WSO C2 is a candidate for inclusion in the coexistence set for WSO A1. The requesting coexistence manager CM_A determines at least one location (X,Y) related to WSO A1. The location may also indicate the altitude, if available. The altitude may be indicated, as an example, as the floor number in a building. The requesting coexistence manager CM_A transmits a request message to CM_C requesting an estimate of the signal level for at least one location (X,Y) of WSO A1, caused by WSO C2, in an example embodiment of the invention.

In the example shown in FIG. 1A, the network controller CM_A serves only one wireless network A1 that operates using the IEEE 802.11 radio technology, the network controller CM_B serves only one wireless network B1 that operates using the IEEE 802.11 radio technology, whereas the network controller CM_C serves two wireless networks C1 and C2 that operate using the IEEE 802.11 radio technology.

Example white space spectrum in the operating area of a WSD device include dedicated TV white space spectrum 30, locally unused TV bands 31, locally unused maritime bands 33, locally unused satellite bands 35, and locally unpaired (TDD) mobile device frequencies.

FIG. 1A also shows three non-limiting example white space spectra locally unused by licensed primary users of their respective spectrum white spaces, which may be used by the master WSD or slave WSD, operating as unlicensed secondary users. TV band white space 31 is locally unused by licensed TV broadcasters. Maritime radio band 33 is locally unused by licensed maritime band radios. Earth station-to-satellite radio band 35 is locally unused by licensed earth station radios. A non-limiting example of a TV band white space 31 locally unused by licensed TV broadcasters is the 174-204 MHz band, representing the local absence of broadcast VHF TV channels 7, 8, 9, 10, and 11. If there were a local absence of licensed broadcasters in TV band white space 31, on VHF TV channels 7, 8, 9, 10, and 11, which would otherwise interfere with the master WSD or slave WSD, then they could operate as unlicensed secondary users and make use of TV band white space 31. If either master WSD or slave WSD were to detect a signal transmitted from a neighboring TV broadcaster in band 31, then they would have to relinquish their use of the TV band white space 31 and make a resource request, in accordance with an example embodiment of the invention. Non-limiting examples of white space spectra are available in many parts of the electromagnetic spectrum. For example, white space spectra are available for personal/portable devices in the UHF portion of the spectrum.

A maritime radio operates in a number of licensed frequency allocations and is a primary user in the maritime radio band 33. If there were no licensed maritime radios in operation that would interfere with the master WSD or slave WSD, then they could operate as unlicensed secondary users and make use of maritime radio band 33. If either master WSD or slave WSD were to detect a signal transmitted from a neighboring maritime radio, then they would have to relinquish their use of the maritime band 33 and make a resource request, in accordance with example embodiments of the invention.

A satellite earth station transmits to satellites in licensed frequency allocations from 2.025 GHz to 2.110 GHz and is a primary user in the earth-to-satellite band 35. If there were no licensed earth station radios in operation that would interfere with the master WSD or slave WSD, then they could operate as unlicensed secondary users and make use of earth-to-satellite radio band 35. If either master WSD or slave WSD were to detect a signal transmitted from a neighboring earth station radio, then they would have to relinquish their use of the earth-to-satellite band 35 and make a resource request, in accordance with example embodiments of the invention.

Figure 1B:
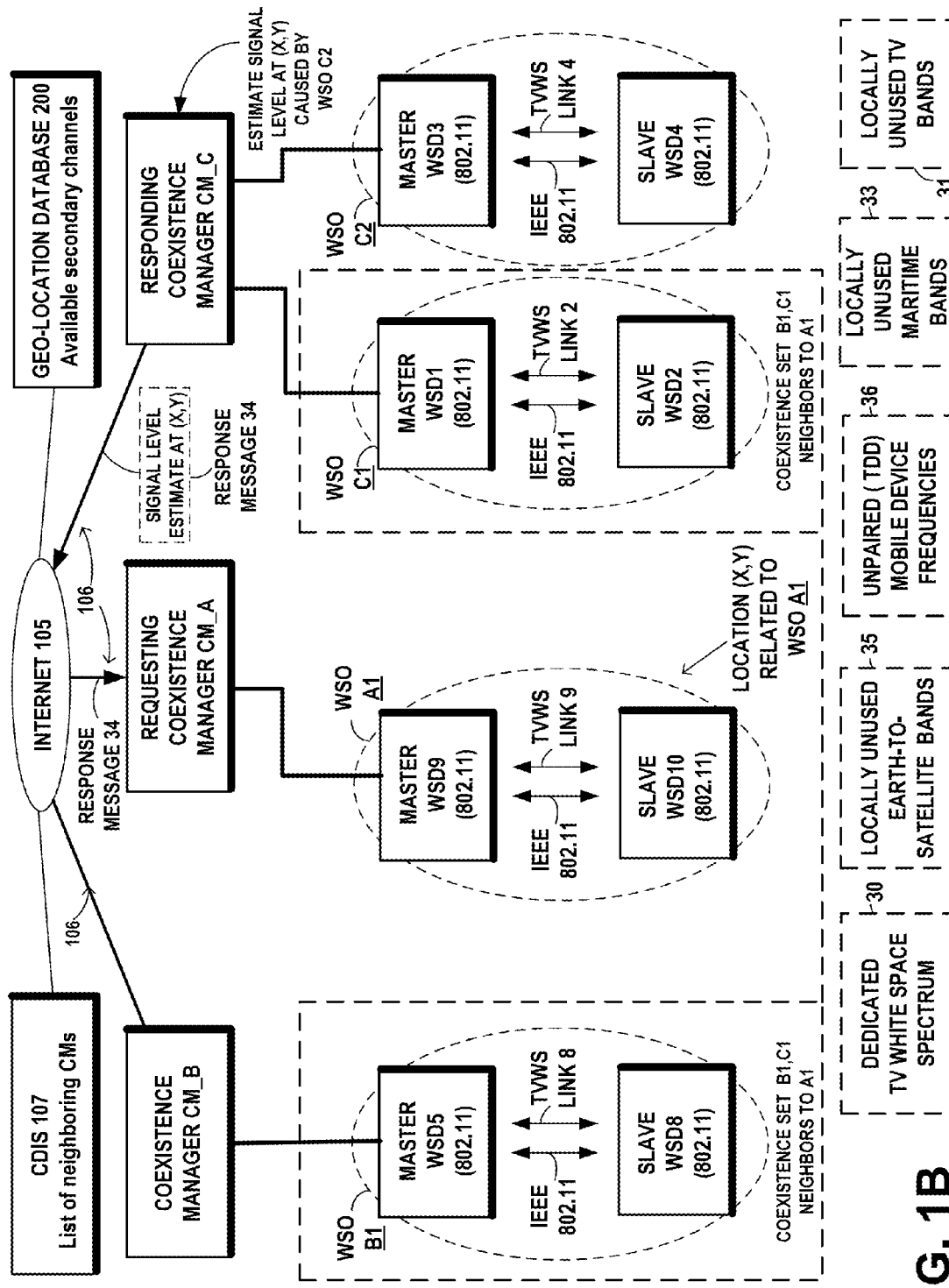
FIG. 1B illustrates the system architecture diagram of FIG. 1A, showing the responding coexistence manager CM_C responding to the request by estimating the signal level for at least one location (X,Y) of WSO A1, caused by WSO C2. The responding coexistence manager CM_C transmits a response message to the requesting coexistence manager, including the estimated signal level for at least one location (X,Y) of WSO A1, caused by WSO C2, in an example embodiment of the invention.

FIG. 1B illustrates the system architecture diagram of FIG. 1A, showing the responding coexistence manager CM_C responding to the request by estimating the signal level for at least one location (X,Y) of WSO A1, caused by WSO C2. The responding coexistence manager CM_C transmits a response message 34 to the requesting coexistence manager CM_A, including the estimated signal level for at least one location (X,Y) of WSO A1, caused by WSO C2, in an example embodiment of the invention.

Figure 1C:
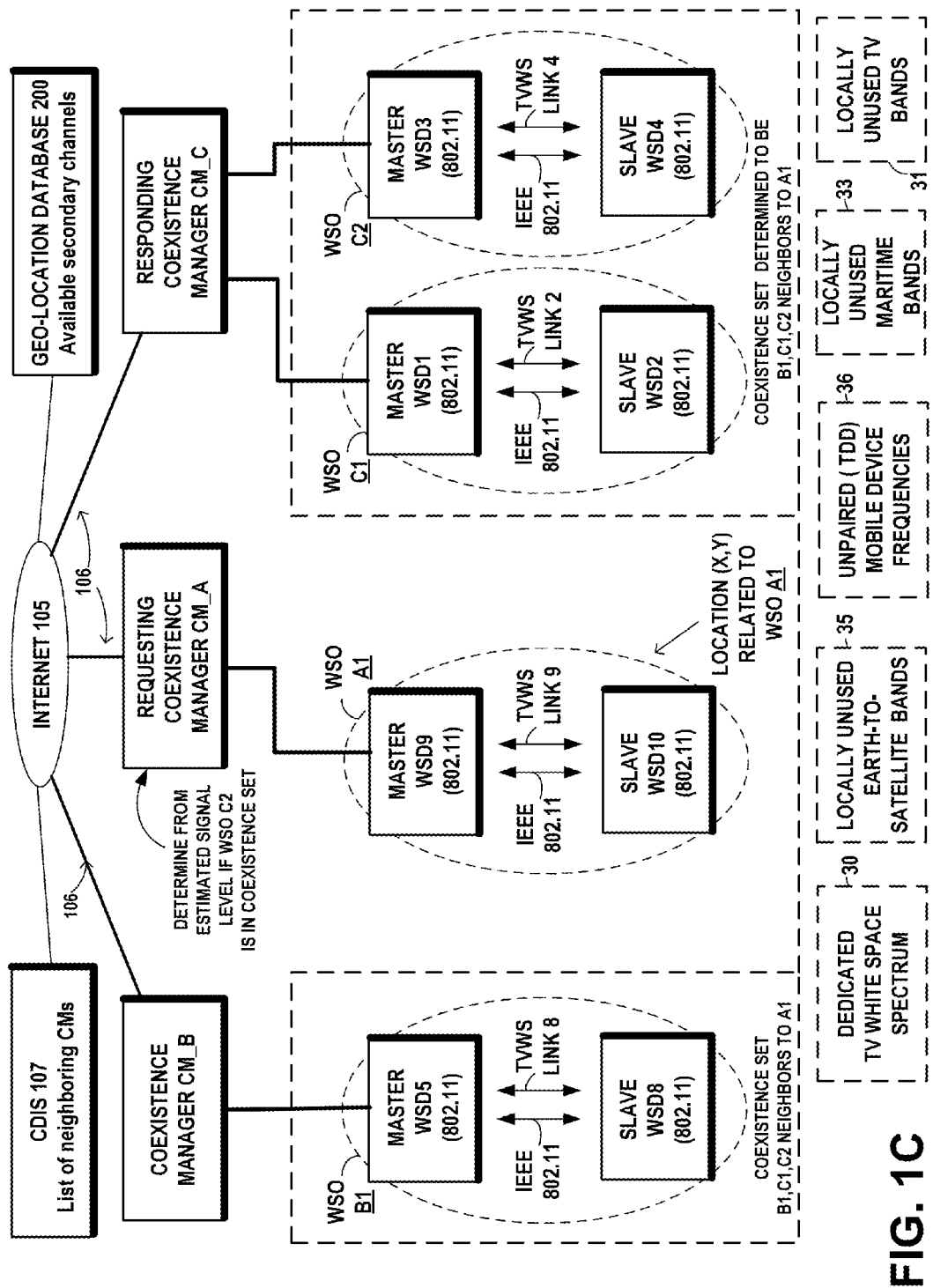
FIG. 1C illustrates the system architecture diagram of FIG. 1B, showing the requesting coexistence manager CM_A determining from the estimated signal level, if the WSO C2 is in the coexistence set of WSO A1. In the example shown, the estimated transmission signal level at the at least one location (X,Y) of WSO A1, is sufficiently high to justify including WSO C2 in the coexistence set of WSO A1, in an example embodiment of the invention.

FIG. 1C illustrates the system architecture diagram of FIG. 1B, showing the requesting coexistence manager CM_A determining from the estimated signal level, if the WSO C2 is in the coexistence set of WSO A1. The coexistence set for WSO A1 comprises those other WSOs, such as WSO B1 and WSO C1, that may interfere with WSO A1 or that the WSO A1 may interfere with. In accordance with an example embodiment of the invention, the requesting coexistence manager CM_A may use the estimated signal level received in response message 34 to determine whether WSO C2 may interfere with WSO A1. The estimated signal level may be indicated as power density, power or field strength caused by WSO C2 in the at least one location (X,Y) of WSO A1. In accordance with an example embodiment of the invention, the requesting coexistence manager CM_A may perform calculations to estimate the effect of the estimated power density, for example, caused by WSO C2 at the at least one location (X,Y), upon WSO A1. In an example embodiment of the invention, the estimated effect may be manifested by an estimated performance degradation of WSO A1, an estimated misinterpretation by WSO A1, or an estimated loss of information by WSO A1 due to the estimated signal level received in response message 34. In the example shown, the estimated transmission signal level at the at least one location (X,Y) of WSO A1, is sufficiently high to justify including WSO C2 in the coexistence set of WSO A1, in an example embodiment of the invention.

Figure 1D:
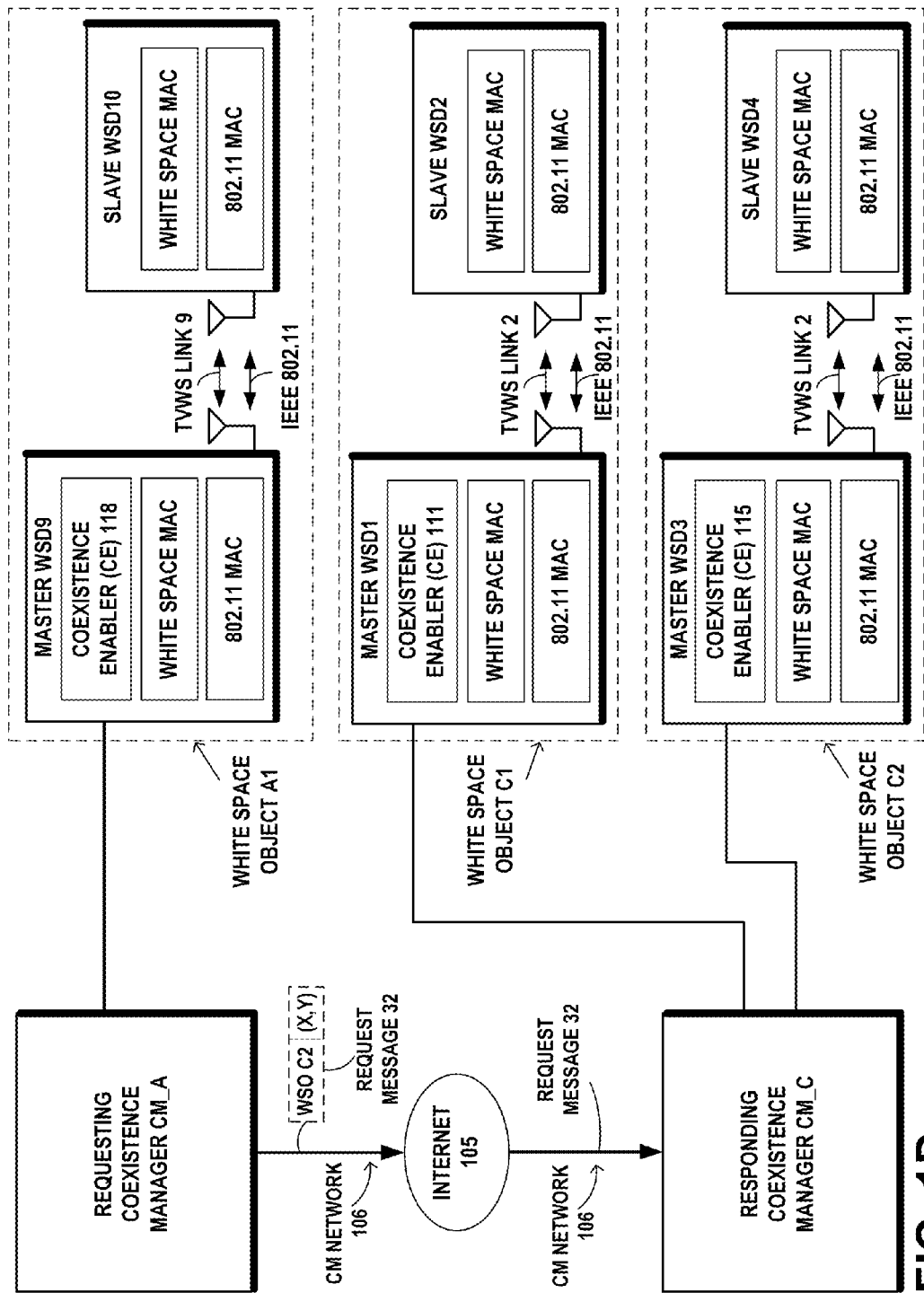
FIG. 1D is an example system architecture according to an example embodiment of the invention, showing two of the network controllers CM_A and CM_C of FIG. 1A serving the respective wireless networks A1 and C1/C2, in an example embodiment of the invention.

FIG. 1D is an example system architecture according to an example embodiment of the invention, showing two of the network controllers CM_A and CM_C of FIG. 1A serving the respective wireless networks A1 and C1/C2, in an example embodiment of the invention.

In an example embodiment of the invention, a network of distributed coexistence managers CM_A and CM_C may communicate with one another over the Internet 105. According to an example embodiment of the invention, the control node or coexistence enabler 118 in the master WSD9 may be registered with the TVWS coexistence manager CM_A. According to an alternate example embodiment of the invention, the control node or coexistence enabler 118 in the master WSD9 may be collocated with the TVWS coexistence manager CM_A or it may be collocated with the master WSD9 without being integrated with the master. The coexistence enabler 115 in the master WSD3 may communicate over the Internet 105 with the TVWS coexistence manager CM_C. The distributed coexistence managers CM_A and CM_C may communicate over the Internet 105, in an example embodiment of the invention. Master WSD1 may be registered through the control node or coexistence enabler 111 to the network controller or coexistence manager CM_C. Master WSD3 may be registered through the control node or coexistence enabler 115 to the network controller or coexistence manager CM_C.

In an example embodiment of the invention, the coexistence enabler 118 may obtain information required for coexistence from a traffic network or device representing it. This may include configuration and control of measurements. Also, the coexistence enabler 118 may provide reconfiguration commands and control information to the master WSD9, corresponding to coexistence decisions received from coexistence manager CM_A. The coexistence manager CM_A is responsible for discovery of Coexistence Managers (CM)s CM_C managing neighboring wireless networks, for example, and coexistence related information may be exchanged with them. The coexistence manager CM_A or CM_C may have the needed information to make decisions of resource sharing among the Coexistence Managers (CM)s managing neighboring wireless networks.

The coexistence manager CM_C handles resource requests from the coexistence enabler 111 in master WSD1. The coexistence manager CM_A handles resource requests from the coexistence enabler 118 in master WSD9. The masters WSD1, WSD3, and WSD9 include IEEE 802.11 MAC and PHY to communicate over their networks. The coexistence enablers 111, 115, and 118 send resource requests to the respective coexistence managers CM_C and CM_A.

In the example system architecture of FIG. 1B the coexistence manager CM_C receives resource requests from the coexistence enabler 111 in master WSD1. The coexistence manager CM_C may receive Spectrum sensing results and network parameters from the coexistence enabler 111 in master WSD1. Network parameters may include specific user requirements (user load, QoS, priority, etc), aggregate spectral efficiency, etiquette (first come, first served, etc.), and user or network policies. The coexistence manager CM_C may access a geo-location database 200 in FIG. 1A to obtain available secondary channels in the TV band white space. The coexistence manager CM_C accesses the coexistence network element coexistence discovery and information server (CDIS) 107 in FIG. 1A to obtain potential neighbor networks' addresses. The coexistence manager CM_C processes this data in conjunction with Spectrum maps, Operational parameters, and Time base sync, to determine a resource reallocation for the coexistence enabler 111 in master WSD1. The coexistence manager CM_C then sends to the coexistence enabler 111 in master WSD1 the resource reallocation, including Operational parameters, Quiet period parameters, Spectrum sensing strategy, and/or Time base sync. The coexistence enabler 111 in master WSD1 then controls at least one of the medium access control (MAC) and the physical layer (PHY) and the Radio resource Control (RRC) and the Radio Resource Management (RRM) to communicate in channels in the TV white spaces band reallocated by the coexistence manager CM_C, without interference from other networks sharing the same white space channels. A similar operation may be carried out by the coexistence manager CM_A in conjunction with the coexistence enabler 118 in master WSD9. A network of distributed coexistence managers CM_C and CM_A may communicate with one another over the Internet 105.

Figure 1E:
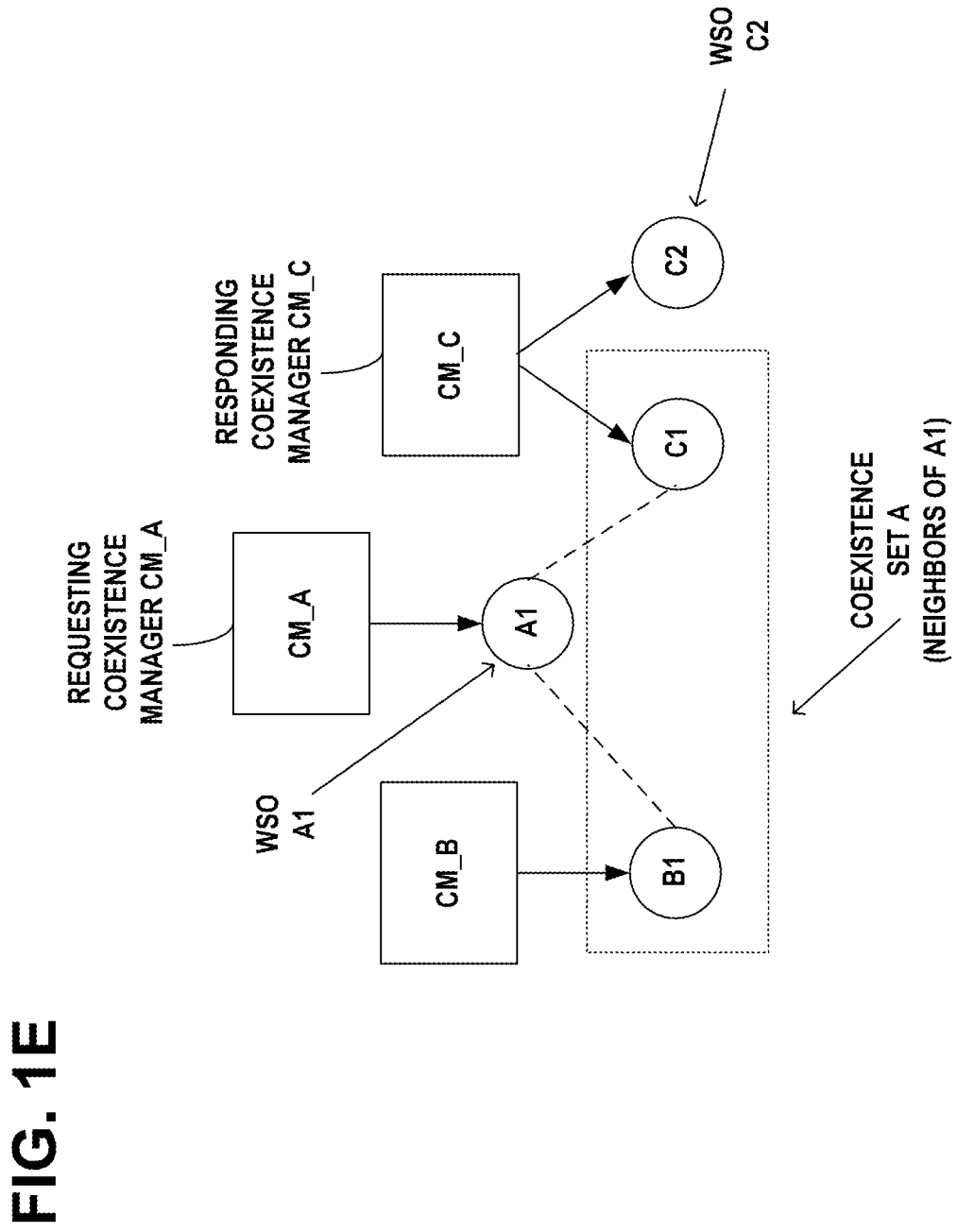
FIG. 1E is an example network diagram according to an example embodiment of the invention, showing a simplified depiction of the coexistence set A of wireless networks B1 and C1 that are neighbors to the wireless network A1, wherein the three network controllers CM_A, CM_B, and CM_C, each manage resource allocations of white space spectrum for a respective one or more wireless networks A1, B1, and C1/C2, in an example embodiment of the invention.

FIG. 1E is an example network diagram according to an example embodiment of the invention, showing a simplified depiction of the coexistence set A of wireless networks B1 and C1 that are neighbors to the wireless network A1. The three network controllers CM_A, CM_B, and CM_C, each manage resource allocations of white space spectrum for a respective one or more wireless networks A1, B1, and C1/C2, in an example embodiment of the invention.

In accordance with an example embodiment of the invention, once a CM has information about a WSO which is a potential coexistence set element for a WSO the CM serves, the CM finds out from another CM which serves the potential coexistence set element whether the WSO the CM serves can be interfered by the WSO which the other CM serves.

In accordance with an example embodiment of the invention, a CM is capable of estimating transmission signal levels of WSOs that it serves, more accurately than the signal levels being indicated in the areas registered to the CDIS. For a rough approximation in a first phase, a CM may simply use the same propagation models that it uses to determine the areas registered to the CDIS, but in a more refined second phase, it may at least take into account differences in transmission and antenna gain in different directions. Alternatively, the CM may use more advanced propagation models in which it takes into account topography of the environment in which the WSO operates. Regardless of the model used, the CM has means to estimate transmission signal level in a set of locations, which have relevance to the operations of the WSO. These estimates are the basis of the method in which CMs interact to determine whether they serve WSOs that are capable of interfering with each other and thus belong to each other's coexistence set.

In accordance with an example embodiment of the invention, when a CM needs to find out whether a potential coexistence set element which is served by another CM is really capable of interfering the WSO which the CM serves, the CM determines at least one location relevant for the WSO. The CM transmits to the other CM a request message which contains the at least one location and identification of the potential coexistence set element. With the request message the CM asks the other CM to estimate transmission signal level of the potential coexistence set element in the at least one given location. In accordance with an example embodiment of the invention, the request message also contains identification of the WSO to which this request is related to (i.e. the WSO which the requesting CM serves) and the frequencies this WSO is capable of operating at. Additionally, the request message may also contain an indication of preferred frequency or frequencies for which the other CM provides transmission signal level estimates.

In accordance with an example embodiment of the invention, a CM that receives a request message from another CM estimates transmission signal level of the WSO which the CM serves and which is indicated in the request and which is the potential coexistence set element in question. Signal level is estimated in the locations indicated in the request message. The CM estimates the signal level in at least one of the frequencies supported by the potential coexistence set element. If the request message contains information about frequencies supported by the WSO served by the requesting CM, the CM estimates the signal level in at least one of the frequencies both the WSOs support. In one embodiment of the invention the CM estimates transmission signal level using a preferred transmit signal bandwidth which it may indicate in the response message. If the potential coexistence set element is a type of a single transceiver with a known location, the CM needs to estimate only the maximum transmission signal level from that transceiver in the location(s) indicated in the request. If the potential coexistence set element is a type of a wireless network which typically comprise of multiple transceiver devices, the CM needs to consider transmissions from the devices in the network. One may not know location of all the devices and if that is the case, the CM should estimate at least some locations and estimate the maximum transmission signal level from transceivers in those locations in the location(s) indicated in the request. When estimating the locations of the devices in the network, the CM should consider the radio propagation conditions and the radio characteristics of the devices in the network. Additionally, the CM should consider devices at the edge of the network coverage area since those devices are possibly closest to the location(s) in the request and thus the sources of the highest transmission signal level in the location(s) indicated in the request.

In accordance with an example embodiment of the invention, once the CM which received a request message has completed transmission signal level estimation it may form a response message which contains at least the estimated transmission signal level for each location indicated in the request. The estimated signal level may be indicated as power density, power or field strength in the given positions. When the level is indicated as power or field strength, one will indicate also the signal bandwidth used in the estimation. Once the response message is ready for transmission the CM which received the request shall transmit the response message to the CM from which the request message was received.

In accordance with an example embodiment of the invention, once the requesting CM (i.e. the CM which transmitted the request message) has received a response message from the other CM indicating estimated transmission signal levels in the at least one location, the requesting CM may determine whether the potential coexistence set element is capable of interfering the WSO which the requesting CM serves and to which the request was related to.

In accordance with an example embodiment of the invention, a CM that is about to send a request message to another CM needs to determine at least one location for which it requests the other CM to estimate transmission signal levels from the WSO (i.e. potential coexistence set element) which the other CM serves. The locations should to be such that the requesting CM may determine from the estimated transmission signal levels in those locations whether the WSO which the CM serves and to which this request is related can be interfered by the potential coexistence set element.

In accordance with an example embodiment of the invention, if the WSO in question is a single transceiver (e.g. fixed type of TVBD as per FCC terms) in one location and the requesting CM may release the WSO's location to the other CM in the request, the location indicated in the request should be the WSO's location. Alternatively, the CM may indicate a set of locations from which one can be the actual location of the WSO.

In accordance with an example embodiment of the invention, if the WSO in question is a network like a WLAN basic service set (BSS) managed and operated by an access point (AP) for which the CM knows just the location of the master device (AP and mode II type device as per the FCC terms), the CM needs to provide multiple locations. The locations should be picked up to be such that represent well possible locations of devices in the network. The locations indicated in the request should cover the location of the master device and the most probable locations of the slave devices. Additionally, one may consider covering especially the locations at the edge of the network since in those locations the transmission signal level from an alien transmitter is expected to be most different from the one in the master's location.

Figure 2A:
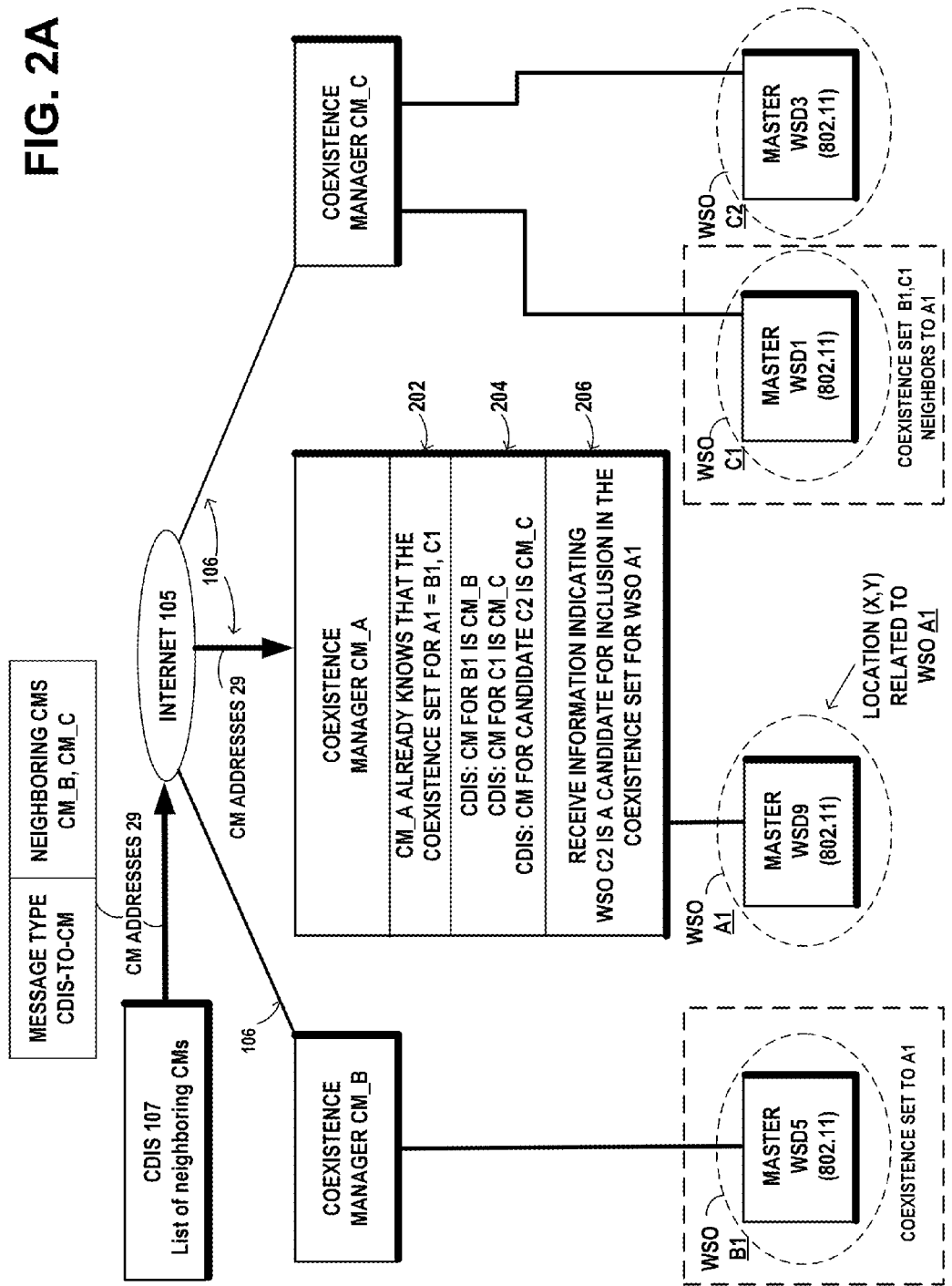
FIG. 2A is an example system architecture according to an example embodiment of the invention of FIG. 1A, which illustrates the requesting network controller or coexistence manager CM_A, accessing the coexistence discovery and information server (CDIS) in FIG. 1A, to obtain the addresses of potential neighbor networks and receiving the addresses of the neighbor coexistence managers CM_B and CM_C. The requesting coexistence manager CM_A receives information indicating WSO C2 is a candidate for inclusion in the coexistence set for WSO A1, in an example embodiment of the invention.

FIG. 2A is an example system architecture according to an example embodiment of the invention of FIG. 1A, which illustrates the requesting network controller or coexistence manager CM_A, receiving from the coexistence discovery and information server (CDIS) in FIG. 1A the addresses of potential neighbor networks and receiving the addresses of the neighbor coexistence managers CM_B and CM_C. The requesting coexistence manager CM_A receives information indicating WSO C2 is a candidate for inclusion in the coexistence set for WSO A1, in an example embodiment of the invention.

The figure shows some example steps that the coexistence manager CM_A may take to accomplish this purpose. In step 202, the coexistence manager CM_A already knows the identity of the neighbor wireless networks of the wireless network A1, which are the wireless networks B1 and C1 in the coexistence set A, since they may interfere with or be interfered by the transfer wireless network A1. The figure illustrates the network controller or coexistence manager CM_A, receiving from the coexistence discovery and information server (CDIS) 107 over the Internet 105 the addresses of potential neighbor coexistence managers that serve the neighbor wireless networks B1 and C1 in the coexistence set A, and a candidate C2. The figure shows in step 204, the coexistence manager CM_A receiving the CM address message 29 reporting the neighbor coexistence managers CM_B and CM_C that serve wireless networks B1, C1, and C2. The figure shows in step 206, the coexistence manager CM_A receive information indicating WSO C2 is a candidate for inclusion in the coexistence set for WSO A1, in an example embodiment of the invention.

FIG. 2B is an example system architecture according to an example embodiment of the invention of FIG. 2A, which illustrates the requesting coexistence manager CM_A is determining at least one location (X,Y) related to WSO A1. The requesting coexistence manager CM_A transmits a request message to CM_C requesting an estimate of the signal level for at least one location (X,Y) of WSO A1, caused by WSO C2, in an example embodiment of the invention.

The figure shows step 207 wherein the requesting coexistence manager CM_A determines at least one location (X,Y) related to WSO A1. In step 208, the network controller or coexistence manager CM_A, is transmitting a request to CM_C requesting an estimate of signal level at (X,Y) caused by WSO C2.

In accordance with an example embodiment of the invention, the request message 32 shown in the figure, may include a message type field, indicating it is a coexistence manager to coexistence manager message. The payload of the request message 32 may include a field indicating that the message is a request for an estimate of the signal level at the location (X,Y) caused by WSO C2. The payload of the request message 32 may include a field indicating the request is for WSO A1. The payload of the request message 32 may include a field indicating the supported frequencies of WSO A1. And, the payload of the request message 32 may include a field indicating preferences for frequencies for signal level estimation. The requesting coexistence manager may indicate preferences for frequencies in which the responding CM performs transmission signal level estimation. A request message 32 may thus contain preference indication information.

FIG. 2C is an example system architecture according to an example embodiment of the invention of FIG. 2A, which illustrates the responding coexistence manager CM_C responding to the request by estimating the signal level for at least one location (X,Y) of WSO A1, caused by WSO C2 and transmitting a response message to the requesting coexistence manager, including the estimated signal level for at least one location (X,Y) of WSO A1, caused by WSO C2. The requesting coexistence manager CM_A determines from the estimated signal level, if the WSO C2 is in the coexistence set of WSO A1. In the example shown, the estimated transmission signal level at the at least one location (X,Y) of WSO A1, is sufficiently high to justify including WSO C2 in the coexistence set of WSO A1, in an example embodiment of the invention.

In accordance with an example embodiment of the invention, the response message 34 shown in the figure, may include a message type field, indicating it is a coexistence manager to coexistence manager message. The payload of the response message 34 may include a field indicating that the message is a signal level estimate at the location (X,Y) caused by WSO C2. The payload of the response message 34 may include a field indicating the response is for WSO A1. The payload of the response message 34 may include a field indicating estimated signal level at frequencies supported by WSO A1. The payload of the response message 34 may include a field indicating the frequencies used in the signal level estimation. And, the payload of the response message 34 may include a field indicating paired frequency and estimated signal level for a plurality of frequencies, for example FREQ_1/LEVEL_1; FREQ_2/LEVEL_2; FREQ_3/LEVEL_3.

The responding CM needs to decide on which frequency or on which frequencies it determines the signal level estimates. If the request message 32 contains frequency preference information, the responding CM may take that information into account when deciding which frequency or which frequencies to use in the estimation.

The responding CM may decide to indicate in the response message 34 the frequency or the frequencies which were used in the signal level estimation. The response message 34 may contain one estimate for one frequency and in case of multiple frequencies the response message contains multiple frequency-estimate pairs.

FIG. 3A is an example network diagram of the WSO A1, illustrating that the at least one location (X,Y) related to WSO A1 may be the actual location, where WSO A1 in is a single transceiver in one location and the requesting coexistence manager CM_A is permitted to release the WSO's location to another coexistence manager. Alternately, the requesting coexistence manager CM_A may indicate a set of locations, one of which may be the actual location of the WSO A1, in an example embodiment of the invention. In this figure, WSO A1 represents a single transceiver WSD9, the requesting coexistence manager CM_A needs to find out whether the WSO can be interfered by another WSO that has been identified as a potential coexistence set element by CDIS. The requesting coexistence manager CM_A determines one or more locations that represent the WSO. One location (i.e. WSO's actual location) is given if the requesting coexistence manager CM_A can release actual location of the WSO to the responding coexistence manager CM_C. Multiple locations are given if the requesting coexistence manager CM_A is not willing to release actual location of the WSO to the responding coexistence manager CM_C. The locations should be selected so that the requesting coexistence manager CM_A can determine from the response that contains transmission signal level estimates to the locations, whether there is interference to the WSO, which is in this case a single transceiver.

FIG. 3B is an example network diagram of the WSO A1 as a network comprising a master device and slave devices, illustrating that the at least one location (X,Y) related to WSO A1 may be an average of all of the locations of the devices in the network, in an example embodiment of the invention. In this figure, WSO A1 represents a network operated by a master device WSD9 to which a variable number of slave devices, including WSD10, in unknown locations are connected within coverage are of the network. The requesting coexistence manager CM_A needs to find out whether the master device or any of the slave devices can be interfered by another WSO that has been identified as a potential coexistence set element by CDIS. The requesting coexistence manager CM_A determines multiple locations that represent the master device and possible slave devices of the network. The requesting coexistence manager CM_A needs to estimate coverage area of the network from which it can estimate possible and probable locations of slave devices. Typically it is enough to indicate locations close to the edge of the coverage area since transmission powers of this type of WSO is very much limited in government regulations and there are no chances to have interferers within the coverage area, which are not interfering devices at the edge. In general, the location should be again selected so that the requesting coexistence manager CM_A can determine from the response, which contains transmission signal level estimates to the locations, whether there is interference to the WSO, which is in this case a master device and a set of slave devices.

Figure 4A:
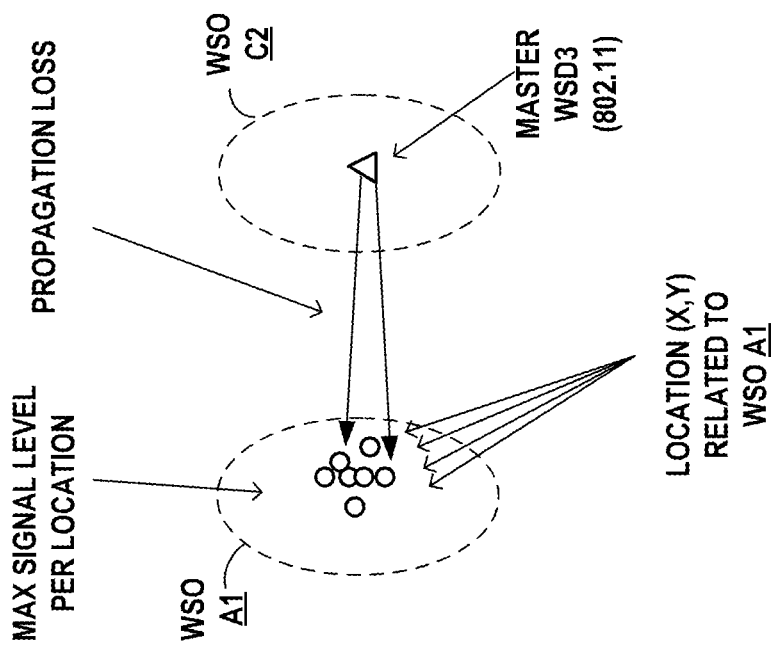
FIG. 4A is an example network diagram of the WSO C2, illustrating that WSO C2 is a single transceiver WSD3 in one location, then the responding coexistence manager CM_C estimates the signal level for at least one location (X,Y) of WSO A1, caused by the single transceiver WSD3, in an example embodiment of the invention.

FIG. 4A is an example network diagram of the WSO C2, illustrating that WSO C2 in is a single transceiver WSD3 in one location, then the responding coexistence manager CM_C estimates the signal level for at least one location (X,Y) of WSO A1, caused by the single transceiver WSD3, in an example embodiment of the invention. The figure shows a transmission signal level estimate in case of a single transceiver WSD3. The responding coexistence manager CM_C needs to estimate maximum transmission signal level from the WSO C2 it serves and for which it has received a signal level estimation request from the requesting coexistence manager CM_A. The requesting coexistence manager CM_A considers this WSO C2 as a potential coexistence set element for WSO A1 that the requesting coexistence manager CM_A serves, and requests this responding coexistence manager CM_C to estimate what is maximum transmission signal level from the WSO C2 that the responding coexistence manager CM_C serves, to a set of locations representing WSO A1. Since the WSO C2, in this case, is a single transceiver WSD3 with a known location, the responding coexistence manager CM_C needs to merely estimate maximum signal level of transmission from WSD3 as it would affect a set of locations representing WSO A1 indicated in the request. The responding coexistence manager CM_C may use any type and kind of propagation model it has to estimate the signal levels. The more realistic model it has available the more accurate the estimation.

Figure 4B:
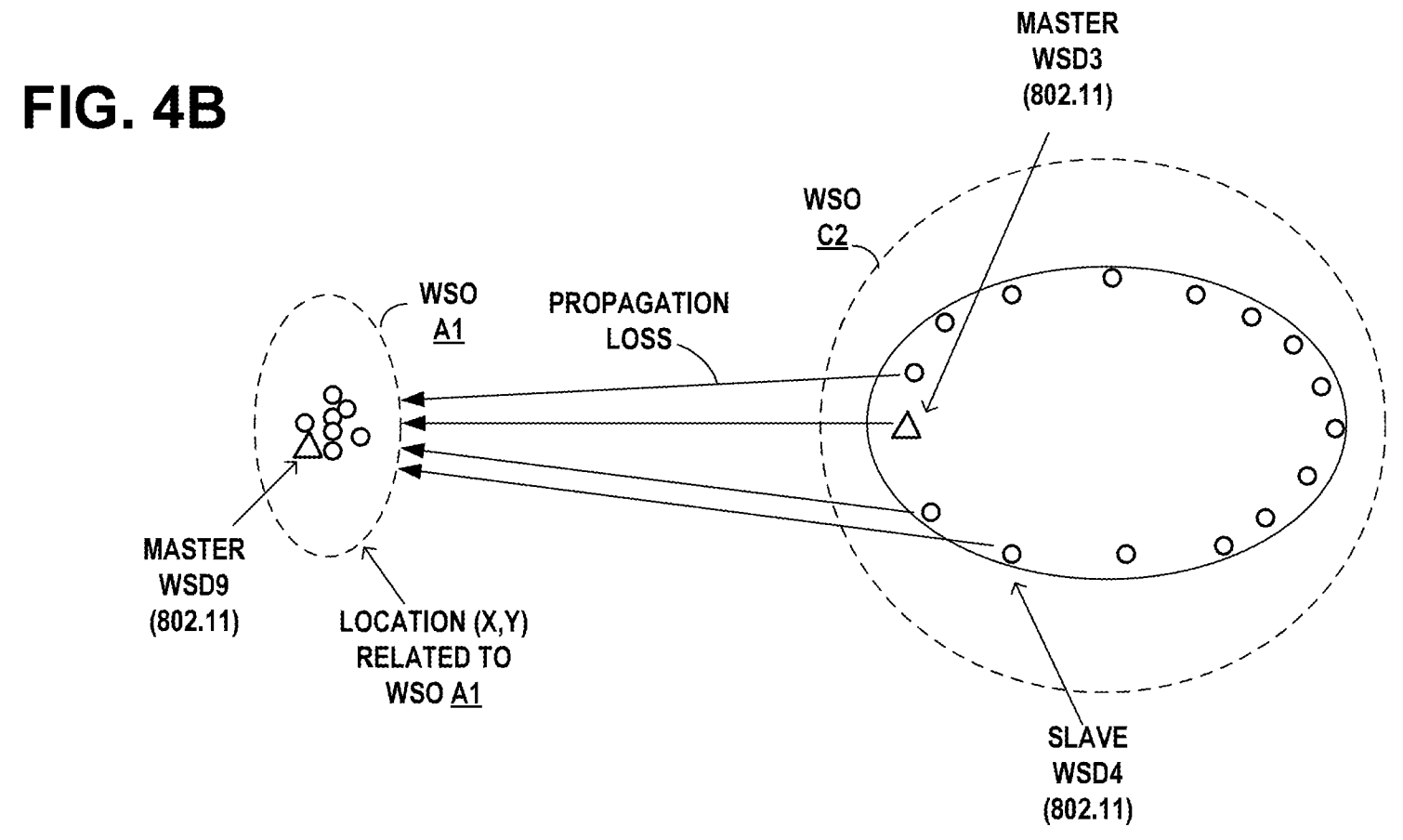

FIG. 4B is an example network diagram of the WSO C2, illustrating that WSO C2 in is a network comprising a master device WSD3 and several slave devices including slave device WSD4, then the responding coexistence manager CM_C estimates the signal level for at least one location (X,Y) of WSO A1, caused by each of the devices in the network of WSO C2, in an example embodiment of the invention. The figure shows transmission signal level estimate in the case of WSO C2 as a network. The responding coexistence manager CM_C needs to estimate transmission signal levels from the WSO C2 it serves and for which it has received a signal level estimation request from requesting coexistence manager CM_A. The requesting coexistence manager CM_A considers this WSO C2 as a potential coexistence set element for WSO A1 that the requesting coexistence manager CM_A serves and requests the responding coexistence manager CM_C to estimate what is maximum transmission signal level from the WSO C2 that responding coexistence manager CM_C serves, to a set of locations representing WSO A1. Since the WSO C2, in this case, is a network operated by a master device WSD3 with a known location and a variable number of slave devices, including WSD4, the responding coexistence manager CM_C needs to estimate what is the maximum signal level of transmission from any device in the network of WSO C2. If the location of the slave devices is unknown, responding coexistence manager CM_C first estimates the locations and subsequently estimates maximum signal levels from devices in those estimated locations in the locations in WSO A1 indicated in the request. If slave locations are known, no location estimate is needed, and the responding coexistence manager CM_C may proceed directly to the signal level estimation. The responding coexistence manager CM_C estimates the maximum transmission signal level for each location in WSO A1 indicated in the request from each device (estimated or actual one) in the WSO C2 network and indicates the highest level for each indicated location in WSO A1. The responding coexistence manager CM_C may use any type and kind of propagation model it has to estimate the signal levels. The more realistic model it has available the more accurate the estimation.

Figure 5:
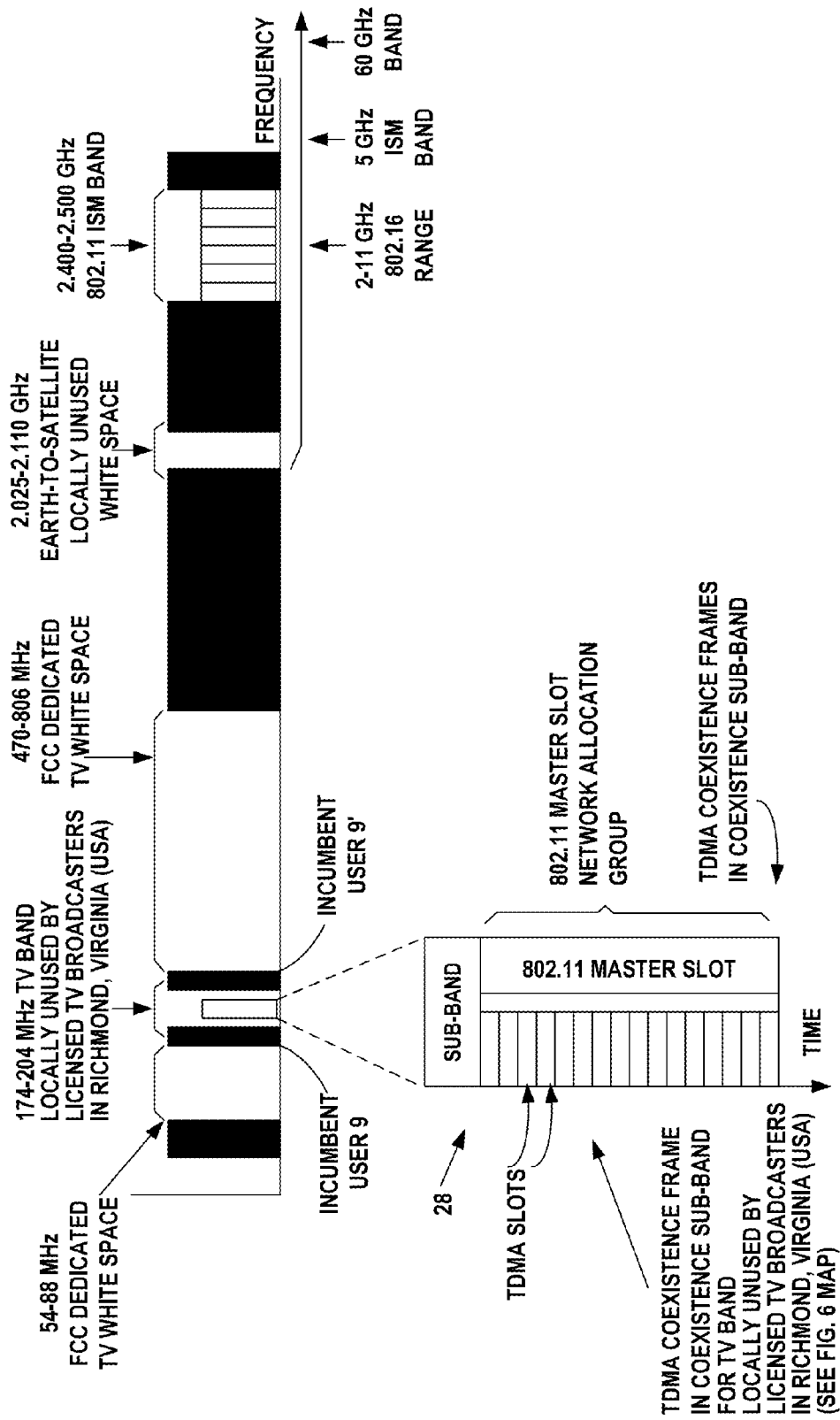
FIG. 5 is a non-limiting example frequency band diagram illustrating an example TDMA coexistence frame sub-band in the TV band white space locally unused by licensed TV broadcasters, representing broadcast TV channels in the Richmond, Va. (USA) area, as shown in FIG. 6, an example TDMA coexistence frame a in sub-band in the FCC dedicated TV band white space, and an example TDMA coexistence frame in a sub-band in the earth station-to-satellite locally unused white space spectrum, according to an embodiment of the present invention.
Figure 6:
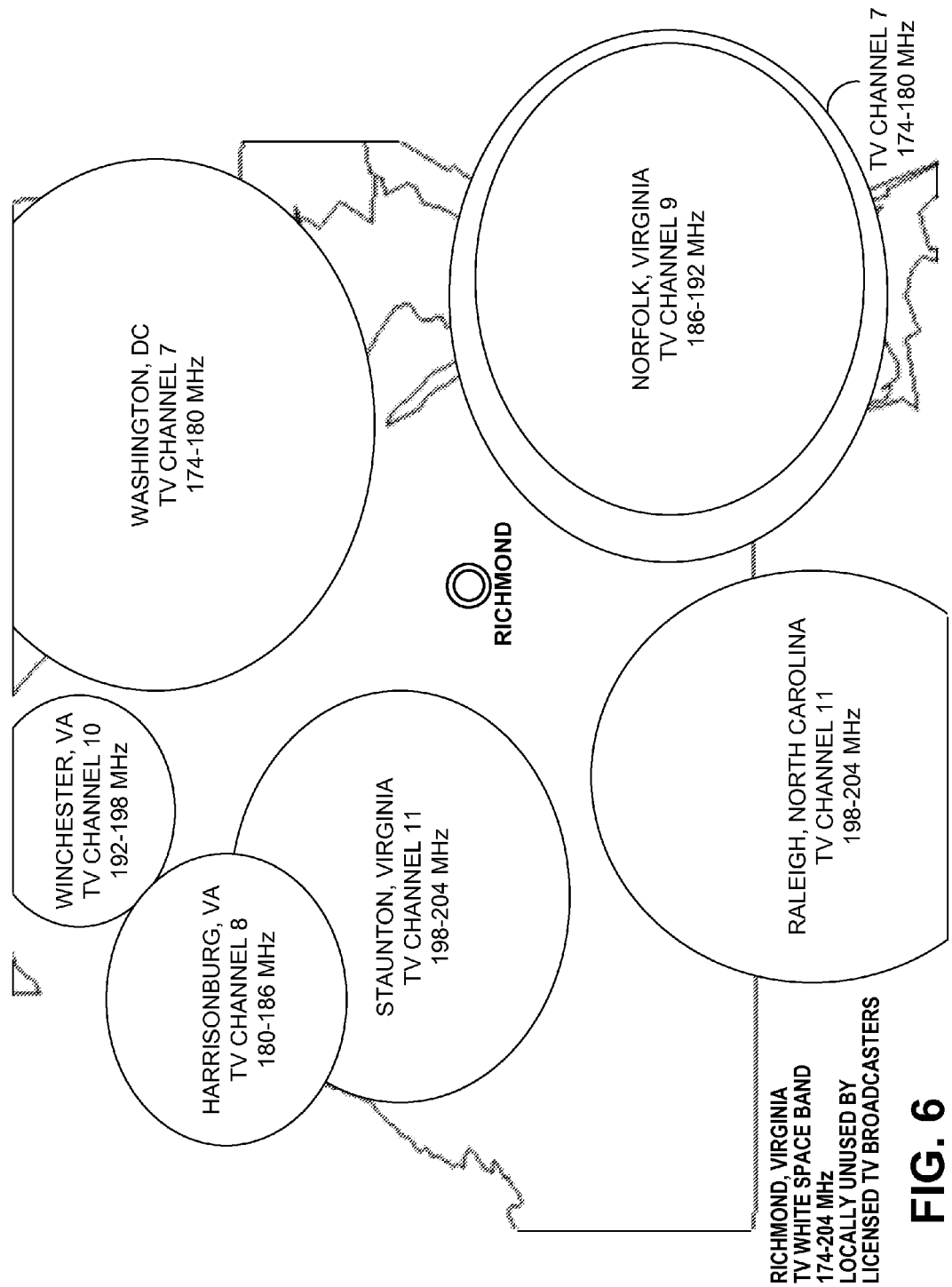
FIG. 6 is an example map of the Richmond, Va. (USA) geographic area and an overlay of coverage areas for broadcast TV channels, illustrating that there is a locally available TV band white space that is unused by licensed TV broadcasters, according to an embodiment of the present invention.

FIG. 5 is a non-limiting example frequency band diagram illustrating an example TDMA coexistence frame sub-band 28 in the TV band white space locally unused by licensed TV broadcasters in the 174-204 MHz band, representing broadcast TV channels 7, 8, 9, 10, and 11 in the Richmond, Va. (USA) area, as shown in FIG. 6, according to an embodiment of the present invention. License-exempt access to these bands as a secondary use for coexistence of networks requesting additional resources, may include restrictions on geographic location, transmission power, range, and bandwidth of the transmissions of the requesting networks, in an example embodiment of the invention.

As a non-limiting example, the 802.11 WLAN standards specify frequencies for operation in the 2.400-2.500 GHz ISM band, the 5 GHz ISM band, and the IEEE 802.11 ad Very High Throughput 60 GHz band. The 802.11 WLAN standards specify an OFDM-based physical layer with a bandwidth of 20 MHz channel separation. At 11 MHz from the center of the channel, the energy is approximately 20 dB lower than the maximum signal level. Further away from the center frequency, the energy levels fall further resulting in minimal interference on adjacent channels. The TV band white spaces at 54-88 MHz and at 470-806 MHz are good candidates for coexistence of an 802.11 WLAN wireless LAN channel. The earth station-to-satellite white space spectrum at 2.025 GHz to 2.110 GHz is a good candidate for coexistence of an 802.11 WLAN wireless LAN channel. A TV band white space locally unused by licensed TV broadcasters, for example, in the 174-204 MHz band, representing the local absence of broadcast TV channels 7, 8, 9, 10, and 11, as is the circumstance in the Richmond, Va. (USA) area, is a good candidate for coexistence of an 802.11 WLAN wireless LAN channel.

FIG. 5 shows a non-limiting example of the location of the white spaces in the RF spectrum and example TDMA coexistence frames in the white space spectrum, showing the freely available time slots before any networks have been allocated slots. The white spaces include the FCC dedicated TV white space 54-88 MHz band, the FCC dedicated TV white space 470-806 MHz band, and locally unused the earth station-to-satellite white space spectrum in 2.025 GHz to 2.110 GHz.

In an example embodiment of the invention, there are a number of TVWS coexistence techniques possible for enabling two or more independently operated wireless networks or devices using different radio technologies adapted for TV white space frequency bands, to access the same TV white space frequency band in the same location without mutual interference. Some examples of coexistence techniques include dynamic frequency selection, transmit power control, listen-before-talk behavior, time division multiplexing different IEEE 802 technologies, message-based on-demand spectrum contention, and control through a centralized network controller or coexistence manager.

FIG. 6 shows an example map of the Richmond, Va. (USA) geographic area and an overlay of coverage areas for broadcast TV channels 7, 8, 9, 10, and 11, illustrating that there is a locally available TV band white space that is unused by licensed TV broadcasters in the 174-204 MHz band, as shown in FIG. 5. The cities where there are TV broadcasters for TV channels 7, 8, 9, 10, and 11 in a circular area of approximately 160 kilometers in diameter surrounding the city of Richmond, Va., are shown in the following table. The map of FIG. 6 shows that there is no coverage by licensed TV broadcasters in the 174-204 MHz band, which is therefore a locally available TV band white space.

| WASHINGTON, DC | TV CHANNEL 7 | 174-180 MHz |
| NORFOLK, VIRGINIA | TV CHANNEL 7 | 174-180 MHz |
| HARRISONBURG, VA | TV CHANNEL 8 | 180-186 MHz |
| WASHINGTON, DC | TV CHANNEL 9 | 186-192 MHz |
| NORFOLK, VIRGINIA | TV CHANNEL 9 | 186-192 MHz |
| WINCHESTER, VA | TV CHANNEL 10 | 192-198 MHz |
| RALEIGH, NC | TV CHANNEL 11 | 198-204 MHz |
| STAUNTON, VIRGINIA | TV CHANNEL 11 | 198-204 MHz |

Figure 7A:
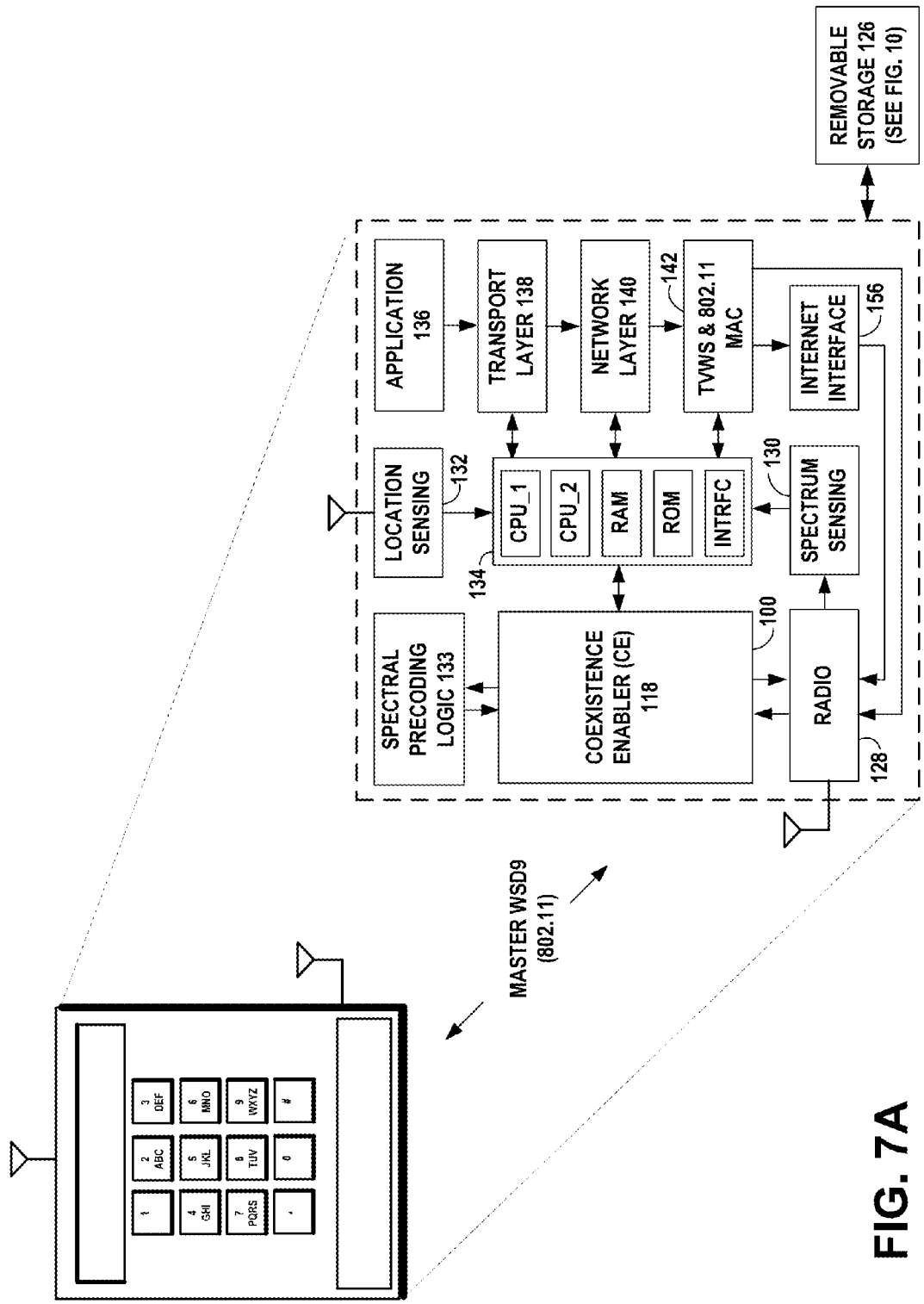
FIG. 7A is a functional block diagram according to an example embodiment of the invention, illustrating an example master WSD9 device including the control node or coexistence enabler for the wireless device. The device may be configured to operate in the TVWS coexistence bands or additional RF spectrum white space spectrum where there may be no primary user radios operating in the neighboring wireless networks, in an example embodiment of the invention.

FIG. 7A is a functional block diagram according to an example embodiment of the invention, illustrating an example master WSD9 device including the control node or coexistence enabler 118 for the wireless device. The device may be configured to operate in the TVWS coexistence bands or additional RF spectrum bands where there may be no primary user radios operating in the neighboring wireless networks, in an example embodiment of the invention.

In an example embodiment of the invention, master WSD9 includes a protocol stack, including the radio 128 and the IEEE 802.11 MAC 142, which may be based, for example, on the IEEE 802.11 WLAN standard. The MAC 142 includes integrated TV white space features. The protocol stack may also include a network layer 140, a transport layer 138, and an application program 136. The example master WSD9 may include a processor 134 that includes a dual or multi core central processing unit CPU_1 and CPU_2, a RAM memory, a ROM memory, and an interface for a keypad, display, and other input/output devices. A location sensor 132, such as a GPS may be included to establish the geographic location of the master WSD9, and the location of the master WSD9 is reported to the network controller or coexistence manager CM_A. The coexistence enabler 118 may send resource requests to the coexistence manager CM_A. The MAC 142 includes integrated TV white space features to communicate using the radio 128 in channels in the TV white spaces band reallocated by the coexistence manager CM_A, without mutual interference. The spectrum sensor 130 senses the electromagnetic environment of the master WSD9 and reports it to the coexistence manager CM_A.

Figure 7B:
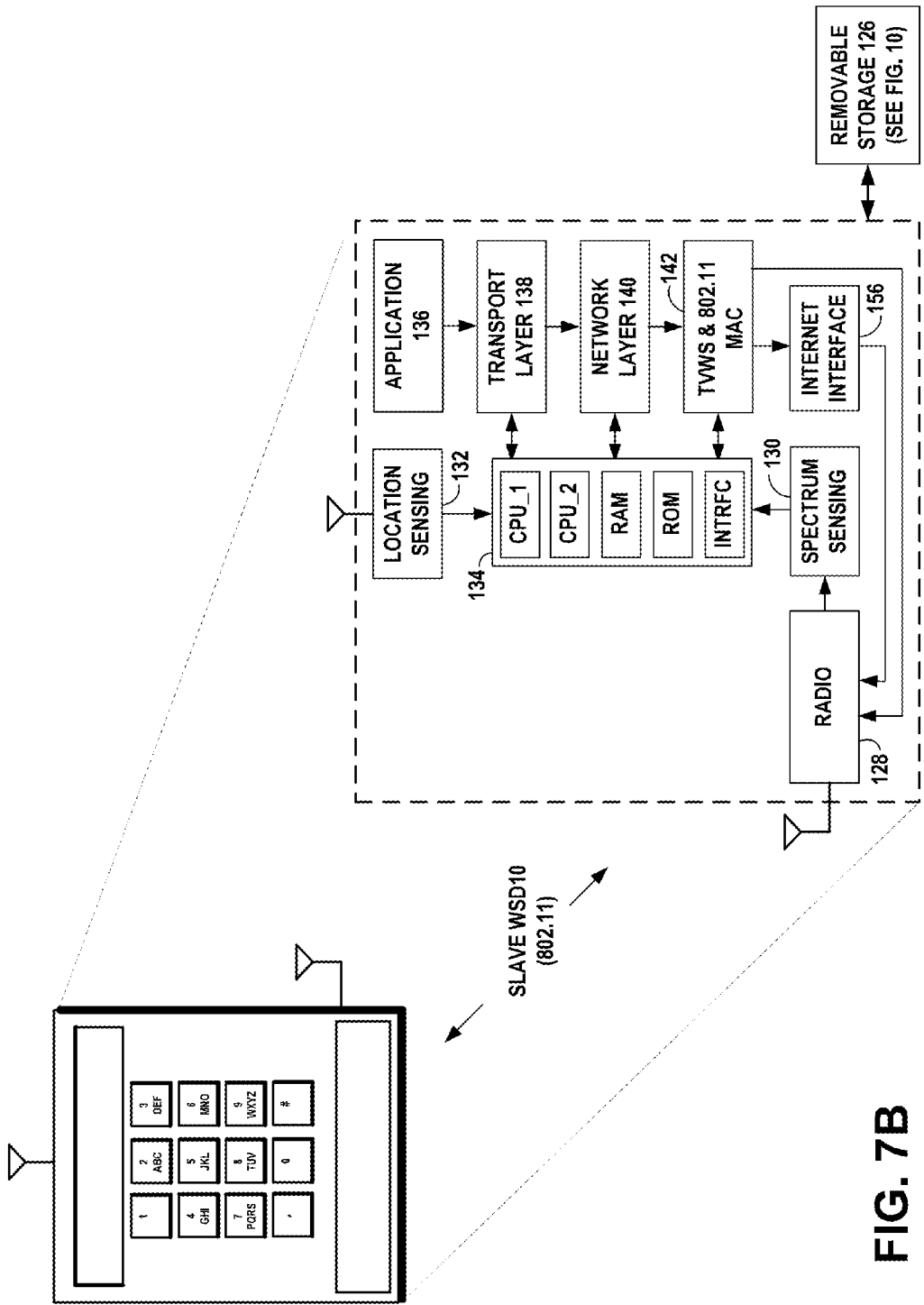
FIG. 7B is a functional block diagram according to an example embodiment of the invention, illustrating an example slave WSD10 device including the control node or coexistence enabler for the wireless device. The device may be configured to operate in the TVWS coexistence bands or additional RF spectrum white space spectrum there may be no primary user radios operating in the neighboring wireless networks, in an example embodiment of the invention.
Figure 7C:
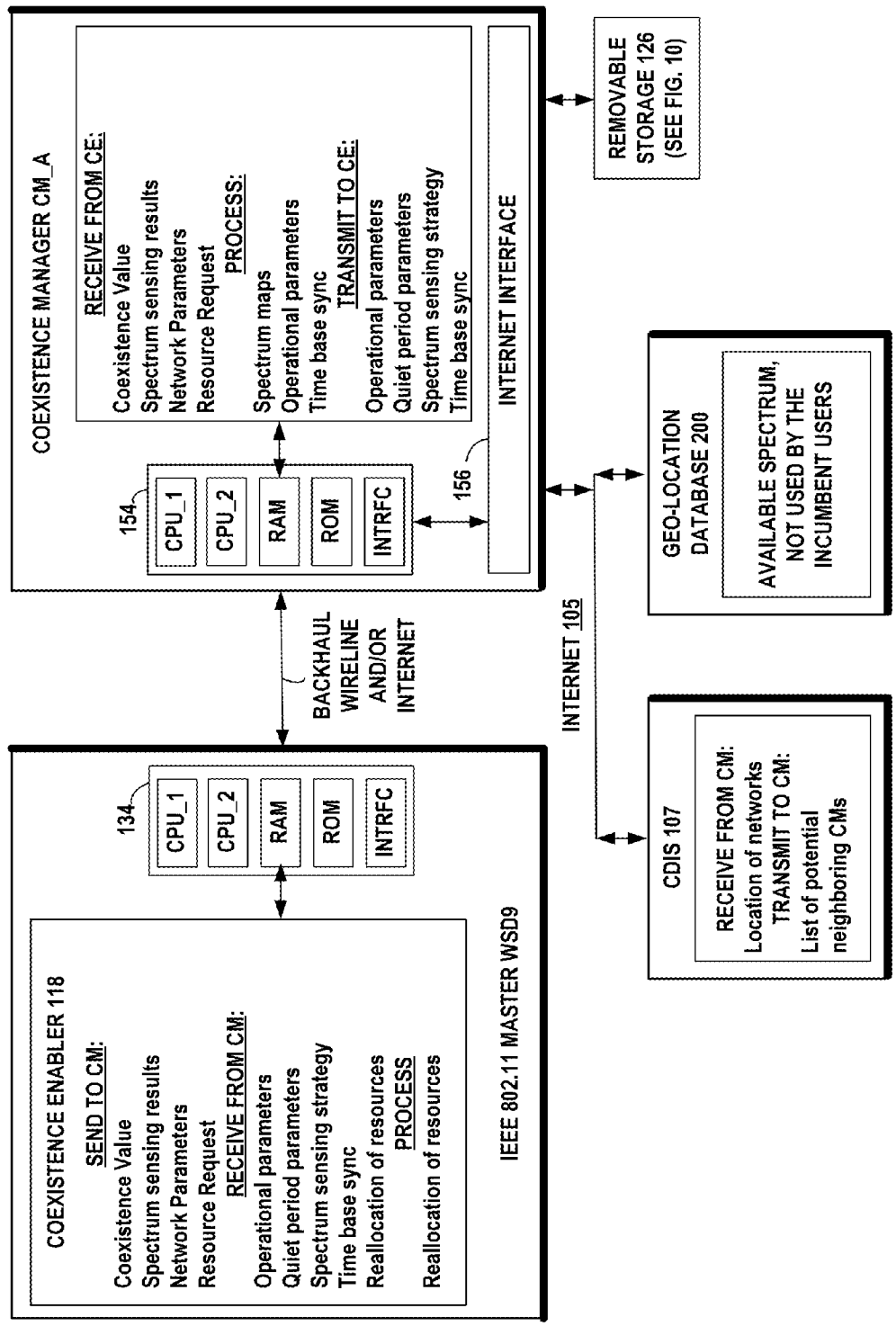
FIG. 7C is an example network diagram according to an embodiment of the present invention, illustrating the control node or coexistence enabler, communicating over a backhaul wireline and/or internet link with the network controller or coexistence manager, in an example embodiment of the invention.

In an example embodiment of the invention, the geo-location database 200 of FIG. 7C, may communicate the allowed emission levels via the Internet 105 to the coexistence manager CM_A, which forwards the allowed emission levels via the Internet 105 to coexistence enabler 118 in the master WSD9.

In an example embodiment of the invention, the master WSD9 includes spectral decoding logic 133. When input data are not properly correlated, a rectangularly-pulsed OFDM signal is discontinuous in phase and thus exhibits large power spectral sidelobes decaying asymptotically as the frequency. Such large sidelobes cause strong interference to adjacent channels and need to be suppressed before transmission. Spectral precoding is capable of suppressing sidelobe powers effectively without trading off system error performance or implementation complexity. By spectral precoding, significant sidelobe suppression is achieved by precoding data symbols in frequency domain without resort to specific data values. The idea is to introduce correlation among data symbols by a fixed precoder matrix in a way that the spectrally-precoded rectangularly-pulsed OFDM signal exhibits extremely small power spectral sidelobes decaying asymptotically, and thereby high spectral efficiency. Spectral precoders are all invertible and thus enable realizable decoding at the receiver while providing good system error performance. An example spectral decoder is described in the publication by Char-Dir Chung, "Spectral Precoding for Constant-Envelope OFDM", *IEEE Transactions on Communications*, vol. 58, no. 2, February 2010, pages 555-567.

In an example embodiment of the invention, the interface circuits in FIG. 7A may interface with one or more radio transceivers, battery and other power sources, key pad, touch screen, display, microphone, speakers, ear pieces, camera or other imaging devices, etc. The RAM and ROM may be removable memory devices such as smart cards, subscriber identity modules (SIMs), wireless identification modules (WIMs), semiconductor memories such as RAM, ROM, PROMS, flash memory devices, etc. as shown in FIG. 10. The processor protocol stack layers, and/or application program may be embodied as program logic stored in the RAM and/or ROM in the form of sequences of programmed instructions which, when executed in the CPU, carry out the functions of example embodiments. The program logic may be delivered to the writeable RAM, PROMS, flash memory devices, etc. of the control node or coexistence enabler and coexistence manager from a computer program product or article of manufacture in the form of computer-usable media such as resident memory devices, smart cards or other removable memory devices. Alternately, they may be embodied as integrated circuit logic in the form of programmed logic arrays or custom designed application specific integrated circuits (ASIC). The one or more radios in the device may be separate transceiver circuits or alternately, the one or more radios may be a single RF module capable of handling one or multiple channels in a high speed, time and frequency multiplexed manner in response to the processor.

In an example embodiment of the invention, the master WSD9 of FIG. 7A includes processor 134 that may access random access memory RAM and/or read only memory ROM in order to obtain stored program code and data for use during processing. The RAM or ROM may generally include removable or imbedded memories that operate in a static or dynamic mode. Further, the RAM or ROM may include rewritable memories such as Flash, EPROM, EEPROM, etc. Examples of removable storage media based on magnetic, electronic and/or optical technologies such as magnetic disks, optical disks, semiconductor memory circuit devices and micro-SD memory cards (SD refers to the Secure Digital standard) are shown at 126 and in FIG. 10, and may serve, for instance, as a data input/output means. Code may include any interpreted or compiled computer language including computer-executable instructions. The code and/or data may be used to create software modules such as operating systems, communication utilities, user interfaces, more specialized program modules, etc.

FIG. 7B is a functional block diagram according to an example embodiment of the invention, illustrating an example slave WSD10 device. The device may be configured to operate in the TVWS coexistence bands or additional RF spectrum bands there may be no primary user radios operating in the neighboring wireless networks, in an example embodiment of the invention.

In an example embodiment of the invention, slave WSD10 includes a protocol stack, including the radio 128 and the IEEE 802.11 MAC 142, which may be based, for example, on the IEEE 802.11 WLAN standard. The MAC 142 includes integrated TV white space features. The protocol stack may also include a network layer 140, a transport layer 138, and an application program 136. The example slave WSD10 may include a processor 134 that includes a dual or multi core central processing unit CPU_1 and CPU_2, a RAM memory, a ROM memory, and an interface for a keypad, display, and other input/output devices. A location sensor 134, such as a GPS may be included to establish the geographic location of the slave WSD10, and the location of the slave WSD10 is reported to the network controller or coexistence manager CM_A. The MAC 142 includes integrated TV white space features to communicate using the radio 128 in channels in the TV white spaces band reallocated by the coexistence manager CM_A, without mutual interference. The spectrum sensor 130 senses the electromagnetic environment of the slave WSD10 and reports it to the master WSD10 that may provide the reports to the coexistence enabler for further processing and delivery to the coexistence manager CM_A.

In an example embodiment of the invention, the geo-location database 200 may communicate the allowed emission levels via the Internet 105 to the coexistence manager CM_A, which forwards the allowed emission levels to the slave WSD10 via the coexistence enabler 118 in the master WSD9 and the master WSD9 itself.

In an example embodiment of the invention, the interface circuits in FIG. 7B may interface with one or more radio transceivers, battery and other power sources, key pad, touch screen, display, microphone, speakers, ear pieces, camera or other imaging devices, etc. The RAM and ROM may be removable memory devices such as smart cards, SIMs, WIMs, semiconductor memories such as RAM, ROM, PROMS, flash memory devices, etc., as shown in FIG. 10. The processor protocol stack layers, and/or application program may be embodied as program logic stored in the RAM and/or ROM in the form of sequences of programmed instructions which, when executed in the CPU, carry out the functions of example embodiments. The program logic may be delivered to the writeable RAM, PROMS, flash memory devices, etc. of the control node or coexistence enabler and coexistence manager from a computer program product or article of manufacture in the form of computer-usable media such as resident memory devices, smart cards or other removable memory devices. Alternately, they may be embodied as integrated circuit logic in the form of programmed logic arrays or custom designed application specific integrated circuits (ASIC). The one or more radios in the device may be separate transceiver circuits or alternately, the one or more radios may be a single RF module capable of handling one or multiple channels in a high speed, time and frequency multiplexed manner in response to the processor.

In an example embodiment of the invention, the slave WSD10 of FIG. 7B includes processor 134 that may access random access memory RAM and/or read only memory ROM in order to obtain stored program code and data for use during processing. The RAM or ROM may generally include removable or imbedded memories that operate in a static or dynamic mode. Further, the RAM or ROM may include rewritable memories such as Flash, EPROM, EEPROM, etc. Examples of removable storage media based on magnetic, electronic and/or optical technologies such as magnetic disks, optical disks, semiconductor memory circuit devices and micro-SD memory cards are shown at 126 and in FIG. 10, and may serve, for instance, as a data input/output means. Code may include any interpreted or compiled computer language including computer-executable instructions. The code and/or data may be used to create software modules such as operating systems, communication utilities, user interfaces, more specialized program modules, etc.

FIG. 7C is an example network diagram according to an embodiment of the present invention, illustrating the control node or coexistence enabler 118, communicating over a backhaul wireline and/or internet link with the network controller or coexistence manager CM_A, in an example embodiment of the invention. The coexistence manager CM_A may communicate over the internet 105 with the geo-location database 200 and the coexistence network element coexistence discovery and Information server (CDIS) 107, in an example embodiment of the invention.

In an example embodiment of the invention, the master WSD, such as WSD9, may send queries for the available spectrum to a geo-location database 200. Database 200 may comprise some internal structure, for example, in form functional blocks such as processors, memory, software/hardware modules, and the like, for performing operations described herein. Such blocks may for example transmit and receive information such as spectrum information, emission characteristics, and/or allowed operating parameters. The master WSD9 uses the IEEE 802.11 wireless LAN (WLAN) protocol for is normal communications on its IEEE 802.11 links, but it is capable of communicating in white space spectrum on TVWS links 2, 3, and 4. The returned information from the geo-location database 200 enables the operation in the white space spectrum, of both the master WSD9 and its associated slave WSD10 that is within the master WSD9's operational area. There may be other reasons to use TVWS, such as better propagation. Normal communication medium typically is available for WLAN (e.g. 2.4 or 5 GHz), but TVWS may not be available everywhere due primary users.

FIG. 8A is an example flow diagram 600 of operational steps in requesting coexistence manager CM_A, according to an embodiment of the present invention. The steps of the flow diagram 600 of FIG. 8A may represent computer code instructions stored in the RAM and/or ROM memory of the master white space device, which when executed by the central processing units (CPU), carry out the functions of an example embodiment of the invention. The steps may be carried out in another order than shown and individual steps may be combined or separated into component steps.

Step 602: receiving, by a coexistence manager, information indicating that a candidate wireless network served by another coexistence manager may interfere with a wireless network served by the coexistence manager;

Step 604: determining, by the coexistence manager, at least one location related to the wireless network served by the coexistence manager;

Step 606: transmitting, by the coexistence manager, a request message to the other coexistence manager, indicating the at least the one location and requesting an estimate of a transmission signal level at the at least one location caused by the candidate wireless network;

Step 608: receiving, by the coexistence manager, from the other coexistence manager, a response message including information indicating an estimated transmission signal level at the at least one location caused by the candidate wireless network; and Step 610: determining, by the coexistence manager, whether the candidate wireless network interferes with the wireless network served by the coexistence manager based on the received estimated transmission signal level at the at least one location.

FIG. 8B is an example flow diagram 650 of operational steps in responding coexistence manager CM_C, according to an embodiment of the present invention. The steps of the flow diagram 600 of FIG. 8B may represent computer code instructions stored in the RAM and/or ROM memory of the master white space device, which when executed by the central processing units (CPU), carry out the functions of an example embodiment of the invention. The steps may be carried out in another order than shown and individual steps may be combined or separated into component steps.

Step 652: receiving, by a coexistence manager, a request message from another coexistence manager, indicating at least one location related to another wireless network served by the other coexistence manager and requesting an estimate of a transmission signal level at the at least one location related to the other wireless network, caused by a candidate wireless network served by the coexistence manager;

Step 654: estimating, by the coexistence manager, a transmission signal level at the at least one location related to the other wireless network, caused by the candidate wireless network; and Step 656: transmitting, by the coexistence manager, a response message including information indicating the estimated transmission signal level at the at least one location.

Figure 9:
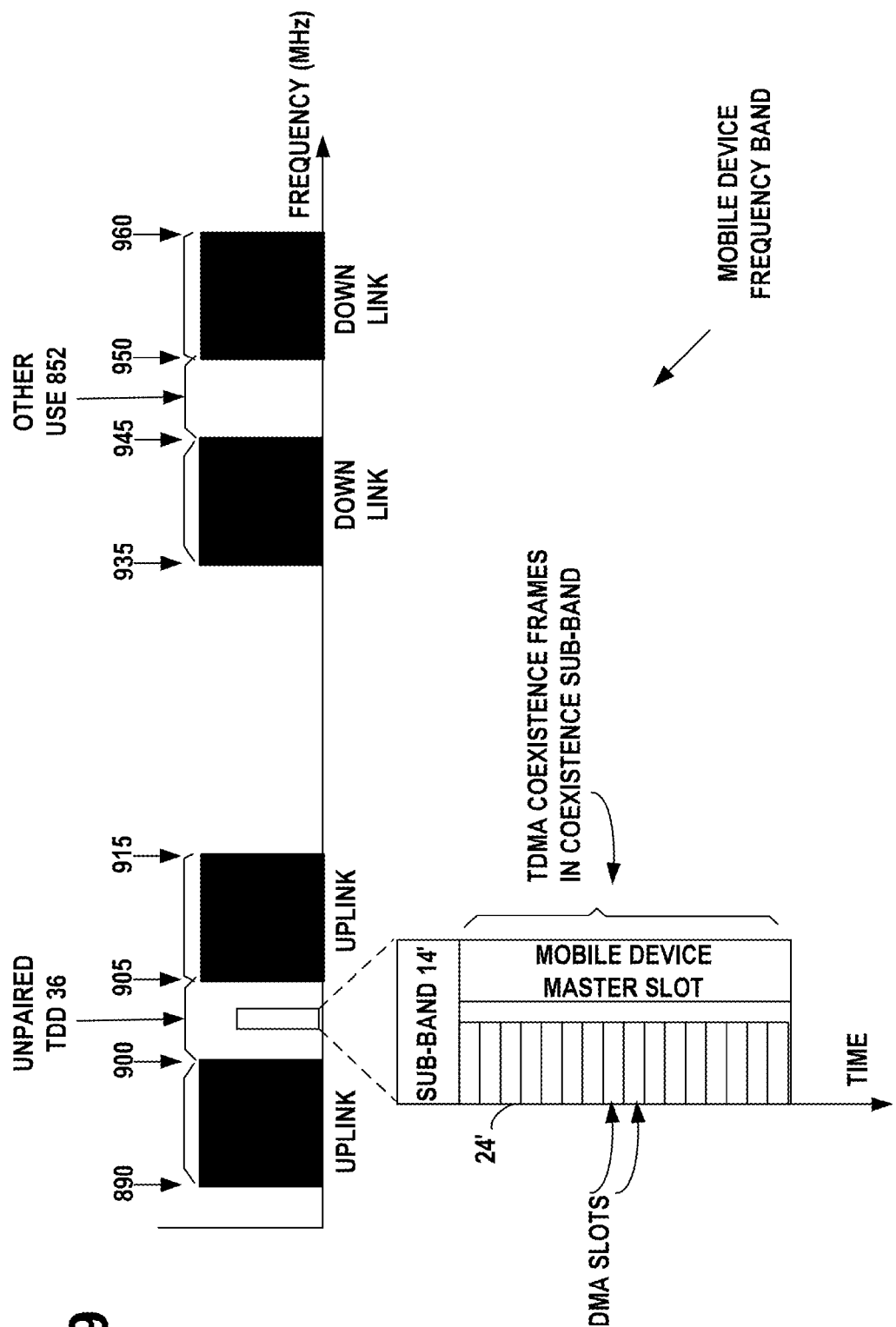
FIG. 9 is an example frequency band diagram illustrating an example TDMA coexistence frame in a sub-band in an unpaired time domain duplex frequency white space in the uplink portion of a mobile device communications frequency band, according to an embodiment of the invention.

FIG. 9 is an example frequency band diagram illustrating an example TDMA coexistence frame 24' in sub-band 14' in an unpaired time domain duplex frequency white space of 900 to 905 MHz in the uplink portion of a mobile device communications frequency band, according to an example embodiment of the invention. FIG. 9 illustrates an example frequency plan for the example mobile device frequency band, with an uplink portion between 890 and 915 MHz and a down link portion between 935 and 960 MHz, similar to a portion of the frequency plan for GSM. In the example frequency plan shown in FIG. 9, a 5 MHz band between 945 and 950 MHz in the down link portion is reserved for other uses, for example as an emergency services band. Since the time domain duplex operation of the mobile device system requires matched uplink frequencies to the allocated down link frequencies, there is an unpaired band between 900 and 905 MHz in the uplink portion. In accordance with an example embodiment of the invention, the unpaired band between 900 and 905 MHz is used as a coexistence band. FIG. 9 shows an example TDMA coexistence frame 24' in sub-band 14' in the unpaired time domain duplex frequency white space 36 in the uplink portion of the mobile device frequency band, which may be used by a cellular telephone base station master device and the cellular telephone slave devices.

In an example embodiment of the invention, a master WSD device and its associated slave WSD device in the master device's operation area, may use a cellular 3rd Generation Partnership Project (3GPP) standard. A cellular 3rd Generation Partnership Project (3GPP) standard, may include Third-Generation (3G), Wideband Code Division Multiple Access (W-CDMA), High Speed Packet Access (HSPA), Long Term Evolution (LTE), LTE Advanced (LTE-A), or International Mobile Telecommunications Advanced (IMT-A). The master WSD device and its associated slave WSD device in the master device's operation area, may use any of these standards for their normal communications on the cell links, but they are capable of communicating in white space spectrum on TVWS links 6, 7, and 8. The returned information from the geo-location database enables the operation in the white space spectrum, of both the master WSD and its associated slave WSD that are within the master WSD's operational area. FIG. 9 shows an example TDMA coexistence frame 24' in sub-band 14' in the unpaired time domain duplex frequency white space 36 in the uplink portion of the mobile device frequency band, which may be used by the cell base master device WSD and the cell slave device WSD. TVWS may be used, for examine, in carrier aggregation, where it is available, in addition to licensed media. Similar examples include local area technologies implemented for example, cellular technologies for small cell operations such as hotspots, pico cells, femto cells, home nodes such as Home Node B (HNB), Home eNodeB (HeNB) and the like. Further, integrated local nodes of secondary networks may consist of 3GPP technologies combined with the IEEE technologies, for example LTE Home eNodeB (LTE HeNB) with Wi-Fi.

FIG. 10 illustrates an example embodiment of the invention, wherein examples of removable storage media 126 are shown, based on magnetic, electronic and/or optical technologies, such as magnetic disks, optical disks, semiconductor memory circuit devices and micro-SD memory cards (SD refers to the Secure Digital standard), for storing data and/or computer program code as an example computer program product, in accordance with at least one embodiment of the present invention.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more non-transitory computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, phone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

The invention claimed is:

1. A method, comprising:
receiving, by a coexistence manager, information indicating that a candidate wireless network served by another coexistence manager may interfere with a wireless network served by the coexistence manager;
determining, by the coexistence manager, at least one location related to the wireless network served by the coexistence manager;
transmitting, by the coexistence manager, a request message to the other coexistence manager, indicating the at least the one location and requesting an estimate of a transmission signal level at the at least one location caused by the candidate wireless network;
receiving, by the coexistence manager, from the other coexistence manager, a response message including information indicating an estimated transmission signal level at the at least one location caused by the candidate wireless network; and
determining, by the coexistence manager, whether the candidate wireless network interferes with the wireless network served by the coexistence manager based on the received estimated transmission signal level at the at least one location.

2. The method of claim 1, wherein the information indicating that the candidate wireless network may interfere with the wireless network served by the coexistence manager is received from a coexistence discovery and information server.

3. The method of claim 1, further comprising:
performing, by the coexistence manager, calculations using the received estimated transmission signal level, to estimate an effect of the received estimated transmission signal level on the wireless network served by the coexistence manager; and
determining, by the coexistence manager, to include the candidate wireless network in a coexistence set based on the performed calculations.

4. The method of claim 1, wherein the at least one location related to the wireless network served by the coexistence manager, is one of actual location or estimated location of one or more apparatuses belonging to the wireless network.

5. The method of claim 1, wherein the request message includes at least one of an identification of the wireless network served by the coexistence manager, and frequencies at which the wireless network served by the coexistence manager, is capable of operating.

6. The method of claim 1, wherein locations indicated in the request cover locations of a master device and most probable locations of slave devices in the wireless network served by the coexistence manager.

7. An apparatus, comprising:
at least one processor;
at least one memory including computer program code;
the at least one memory and the computer program code configured to, with the at least one processor, cause the apparatus at least to:
receive information indicating that a candidate wireless network served by another coexistence manager may interfere with a wireless network served by the apparatus;
determine at least one location related to the wireless network served by the apparatus;
transmit a request message to the other coexistence manager, indicating the at least the one location and requesting an estimate of a transmission signal level at the at least one location caused by the candidate wireless network;
receive from the other coexistence manager, a response message including information indicating an estimated transmission signal level at the at least one location caused by the candidate wireless network; and
determine whether the candidate wireless network interferes with the wireless network served by the apparatus, based on the received estimated transmission signal level at the at least one location.

8. The apparatus of claim 7, wherein the information indicating that the candidate wireless network may interfere with the wireless network served by the coexistence manager is received from a coexistence discovery and information server.

9. The apparatus of claim 7, further comprising:
the at least one memory and the computer program code configured to, with the at least one processor, cause the apparatus at least to:
perform calculations using the received estimated transmission signal level, to estimate an effect of the received estimated transmission signal level on the wireless network served by the coexistence manager; and
determine to include the candidate wireless network in a coexistence set based on the performed calculations.

10. The apparatus of claim 7, wherein the at least one location related to the wireless network served by the coexistence manager, is one of actual location or estimated location of one or more apparatuses belonging to the wireless network.

11. The apparatus of claim 7, wherein the request message includes at least one of an identification of the wireless network served by the coexistence manager, and frequencies at which the wireless network served by the coexistence manager, is capable of operating.

12. The apparatus of claim 7, wherein locations indicated in the request cover locations of a master device and most probable locations of slave devices in the wireless network served by the coexistence manager.

13. A computer program product comprising computer executable program code recorded on a computer readable, non-transitory storage medium, the computer executable program code comprising:
code for receiving, by a coexistence manager, information indicating that a candidate wireless network served by another coexistence manager may interfere with a wireless network served by the coexistence manager;
code for determining, by the coexistence manager, at least one location related to the wireless network served by the coexistence manager;
code for transmitting, by the coexistence manager, a request message to the other coexistence manager, indicating the at least the one location and requesting an estimate of a transmission signal level at the at least one location caused by the candidate wireless network;
code for receiving, by the coexistence manager, from the other coexistence manager, a response message including information indicating an estimated transmission signal level at the at least one location caused by the candidate wireless network; and
code for determining, by the coexistence manager, whether the candidate wireless network interferes with the wireless network served by the coexistence manager based on the received estimated transmission signal level at the at least one location.

* * * * *